(12) United States Patent
Al-Masoud

(10) Patent No.: US 10,878,500 B2
(45) Date of Patent: *Dec. 29, 2020

(54) SYSTEMS AND METHODS FOR MANAGING A TALENT BASED EXCHANGE

(71) Applicant: Flair, Inc., New York, NY (US)

(72) Inventor: Mezyad M. Al-Masoud, New Haven, CT (US)

(73) Assignee: Flair, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/411,768

(22) Filed: Jan. 20, 2017

(65) Prior Publication Data

US 2017/0206603 A1 Jul. 20, 2017

Related U.S. Application Data

(60) Provisional application No. 62/280,893, filed on Jan. 20, 2016.

(51) Int. Cl.
*G06Q 40/04* (2012.01)
*G06F 16/951* (2019.01)
(Continued)

(52) U.S. Cl.
CPC .......... *G06Q 40/04* (2013.01); *G06F 16/951* (2019.01); *G06Q 40/025* (2013.01); *G06Q 40/06* (2013.01); *G06Q 40/08* (2013.01); *H04L 9/3236* (2013.01); *G06Q 2220/00* (2013.01); *H04L 2209/38* (2013.01); *H04L 2209/56* (2013.01)

(58) Field of Classification Search
CPC .............................. G06Q 40/08; G06Q 40/04
See application file for complete search history.

(56) References Cited

U.S. PATENT DOCUMENTS 5,809,484 A 9/1998 Mottola et al.
7,272,572 B1 9/2007 Pienkos
(Continued)

OTHER PUBLICATIONS

Lattman, "If you like a Star Athlete, Now you can buy a share", Oct. 17, 2013, New York Times (Year: 2013).*
(Continued)

*Primary Examiner* — Kito R Robinson
*Assistant Examiner* — Abdulmajeed Aziz
(74) *Attorney, Agent, or Firm* — Wolf, Greenfield & Sacks, P.C.

(57) ABSTRACT

Various aspects of the invention relate to creating a process and system that manages integration of securitization elements into tradable stocks, trading and execution of the stocks, and the generation of the underlying instruments that link a Talented Person's earning potential backed by one or more insurance policies to a tradable stock. The tradable stock itself is a unique technologically based digital object. The digital object is configured to encode various elements of the Talent's profile, encode securitization elements, and encode ownership and/or encode transaction histories within the digital object. The encoding is configured such that any owner, purchaser, or other party can validate the digital object based on the included encoding. Further, records of digital stock information and digital stock transactions can be distributed to users of the system via distributed ledger technology.

15 Claims, 24 Drawing Sheets

(51) Int. Cl.
*H04L 9/32* (2006.01)
*G06Q 40/06* (2012.01)
*G06Q 40/08* (2012.01)
*G06Q 40/02* (2012.01)

(56) References Cited

U.S. PATENT DOCUMENTS

| | | | | |
|---|---|---|---|---|
| 8,781,939 | B1* | 7/2014 | Sinno | G06Q 10/105 |
| | | | | 705/36 R |
| 9,635,000 | B1* | 4/2017 | Muftic | H04L 9/3239 |
| 10,650,456 | B2 | 5/2020 | Al-Masoud | |
| 2002/0002523 | A1 | 1/2002 | Kossovsky et al. | |
| 2002/0077961 | A1* | 6/2002 | Eckert | G06Q 40/04 |
| | | | | 705/37 |
| 2002/0198766 | A1 | 12/2002 | Magrino et al. | |
| 2003/0018571 | A1* | 1/2003 | Eckert | G06Q 40/04 |
| | | | | 705/37 |
| 2003/0182171 | A1 | 9/2003 | Vianello | |
| 2006/0206027 | A1* | 9/2006 | Malone | G06Q 50/22 |
| | | | | 600/437 |
| 2007/0022029 | A1* | 1/2007 | Ma | G06Q 40/02 |
| | | | | 705/35 |
| 2007/0233594 | A1 | 10/2007 | Nafeh | |
| 2007/0260671 | A1* | 11/2007 | Harinstein | G06Q 30/02 |
| | | | | 709/203 |
| 2009/0048927 | A1* | 2/2009 | Gross | G06F 16/95 |
| | | | | 705/14.42 |
| 2010/0161386 | A1* | 6/2010 | Rabalais | G06Q 10/0635 |
| | | | | 705/7.28 |
| 2011/0246212 | A1 | 10/2011 | Barnes | |
| 2012/0226595 | A1* | 9/2012 | Torres | G06Q 40/06 |
| | | | | 705/37 |
| 2012/0254188 | A1* | 10/2012 | Koperski | G06F 16/9535 |
| | | | | 707/740 |
| 2013/0275193 | A1* | 10/2013 | Chuang | G06Q 10/06311 |
| | | | | 705/14.16 |
| 2014/0113610 | A1 | 4/2014 | Ramprasad et al. | |
| 2015/0262208 | A1* | 9/2015 | Bjontegard | G06Q 30/0202 |
| | | | | 705/7.31 |
| 2015/0324764 | A1 | 11/2015 | Van Rooyen | |
| 2015/0332395 | A1 | 11/2015 | Walker et al. | |
| 2016/0275455 | A1* | 9/2016 | Moll | G06Q 10/1053 |
| 2016/0371618 | A1* | 12/2016 | Leidner | G06N 20/00 |
| 2017/0140408 | A1* | 5/2017 | Wuehler | G06Q 30/0207 |
| 2017/0206604 | A1 | 7/2017 | Al-Masoud | |

OTHER PUBLICATIONS

Invitation to Pay Additional Fees dated Mar. 7, 2017 in connection with International Application No. PCT/US2017/014245.
International Search Report and Written Opinion dated May 23, 2017 in connection with International Application No. PCT/US2017/014245.
Extended European Search Report dated Jun. 14, 2019 in connection with European Application No. 17741977.7.
Lattman et al., If You Like a Star Athlete, Now You Can Buy a Share. New York Times. Oct. 17, 2013; 5 pages.
U.S. Appl. No. 16/872,297, filed May 11, 2020, Al-Masoud.

\* cited by examiner

| Plan | Carrier | Type | Insurance Cost | |
|---|---|---|---|---|
| Edge Insurance | ABC | Whole | 3.5% | Select |
| Colin Insurance | XYZ | Variable | 4% | Select |
| Flexible Insurance | CBA | Term | 4% | Select |

Select your preferred insurance plan 1100

FIGURE 11

Select your investment within your life insurance plan  1200

| Underlying Asset Class | Portfolio Manager | Historical Return | | | | | | |
|---|---|---|---|---|---|---|---|---|
| | | MTD | YTD | 1yr | 3rs | 5yrs | Since Inception | |
| Large Cap Growth Equity ETF | Vanguard | 1% | 2% | 3% | 4% | 5% | 10% | Select |
| Mid Cap Value Equity ETF | iShares | 1% | 2% | 3% | 4% | 5% | 10% | Select |
| Small Cap Small Cap Growth ETF | Vanguard | 1% | 2% | 3% | 4% | 5% | 10% | Select |
| Bonds Cap High Yield | Pimco | 1% | 2% | 3% | 4% | 5% | 10% | Select |
| Low Yield | Pimco | 1% | 2% | 3% | 4% | 5% | 10% | Select |

```
Certificate Details {
        Title Digitized Stock Certificate      ___—1410
        CompanyName Lebron23
        OwnerName Current Stock Owner
}

Income Share Agreement Details {
        Function CalcTotalIncome {
        Salary                              ___—1420
        Endorsements
        Licensing Contracts
        }
                                                           ___—1440
        Add Signature {                ___—1430
        Signature sig = signature.getsign
        };                                       Talent e-signature
        return signature

```
Certificate Details {                                    1700
        Title Digitized Stock Certificate
                                        ─ 1710
        CompanyName Lebron23
        OwnerName Current Stock Owner
}

Income Share Agreement Details {
        Function CalcTotalIncome {
        Salary                          ─ 1720
        Endorsements
        Licensing Contracts
        }
}

Insurance Contract Details {
        Life Insurance                  ─ 1730
        Investment
        Disability Insurance
}

Investment Portfolio Details {
        Function CalcInvestments {
        Stocks                          ─ 1740
        Mutual Funds
        Bonds
        }
}

Intellectual Properties Details {
        Function CalcIntellect {
        Brand
        Licensing                       ─ 1750
        Projects
        Inventions
        Etc.
        }
}

Intellectual Properties Details {
        #Contract1
        #Contract2                      ─ 1760
        #Contract 3
                          ┌────────┐ ─1780   ┌────────┐ ─1770
                          │ Return │         │ Submit │
}                         └────────┘         └────────┘
```

FIGURE 17

| Income Share Agreement | Insurance Contract | Investment Contract | Investment Portfolio Contract | Intellectual Property Contract | Attach Existing Contracts |

The XYZ Insurance Company

- Life Insurance Coverage Information
- Disability Insurance Coverage Information
- Investment Information
- Terms and Conditions
- Disputes
    - Arbitration Agreement
- Payment Methods
- Miscellaneous e-signature: Type your name here    Date: MM/DD/YY

[Confirm]    [Reject]

FIGURE 20

```
Certificate Details {
        Title Digitized Stock Certificate         — 2110
        CompanyName Lebron23
        OwnerName Current Stock Owner
}

Income Share Agreement Details {     — 2120
        Pending
}

Insurance Contract Details {         — 2130
        Pending
}

Investment Portfolio Details {       — 2140
        Pending
}

Intellectual Properties Details {    — 2150
        Pending
}

Existing Contracts {     — 2160
        Pending
}
```

FIGURE 21

*The Company will integrate all feedback received and create internal rating (e.g. from 1 to 5 stars).*

*Feedback to clients will be taken on annual basis with few questionnaires such as*

Service: | Highly Satisfied | Satisfied | Neither | Dissatisfied | Poor |

Claim Time: | Highly Satisfied | Satisfied | Neither | Dissatisfied | Poor |

*How likely is that you would recommend your insurance to a friend or colleague?*

| Highly Likely | Likely | Neither | Maybe | Never |

FIGURE 22

SYSTEMS AND METHODS FOR MANAGING A TALENT BASED EXCHANGE

RELATED APPLICATIONS

This application claims priority under 35 U.S.C. § 119(e) to U.S. Provisional Application Ser. No. 62/280,893 entitled "TALENT EXCHANGE," filed on Jan. 20, 2016, which application is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

It is widely known that money management issues persist in the sport industry, music industry, and other industries where individual performers or talented persons (collectively "Talent") achieve large salaries in short periods of time. For example, within two years of retirement, 78% of former NFL players file for bankruptcy or experience financial stress (for NBA players, 60% do so within five years). Three out of five Premier League soccer players declare bankruptcy after retirement. Many athletes face major financial burdens in retirement primarily due to ill-conceived investments, a failure to budget and moderate spending habits, or as a result of large medical bills related to career injuries. One of the causes attributable to poor money management comes as a direct result of a culture that glorifies conspicuous consumption during a short-term period with little long-term, post-career financial planning.

Further exacerbating these issues, the payroll system for NFL and NBA players can add more issues as the athletes receive salaries on a weekly basis and do not receive any income during the off-season. As a result, many athletes seek private loans, which may charge interest rates up to 40%, since lenders claim that sports is a very risky career. This issue leads to the pilling up of debts. Many athletes attempt to create additional sources of income through private investment deals. Of these private investment deals, only about one in thirty are successful. Furthermore, Talents are faced with several fraudulent investment offers.

Another problem is that many Talents in the world are discouraged by the traditional financial system from working on an invention or artwork that they are passionate about. With conventional financing methods, the financing decision is limited to a few expert decision makers such as banks, investment funds, or production companies. This in turn limits access to funds that may be necessary for a Talent to perform and produce.

SUMMARY

It is realized that improved management systems and methods are required. Various aspects and embodiments are directed to systems and methods that enable creation of a unique investment strategy that provides financial security after retirement, reduces reliance on private loans, receives funding that will not affect the credit score and will partially transfer risks to the investors investing in the Talent, protects against downside risk for investors (e.g., if any serious injuries were to happen to the Talent, he/she will receive claims through insurance), and dynamically determines and secures insurance coverage to protect the downside risk for investors (e.g., who view this not only as a new asset class, but one that is uncorrelated to existing asset classes, and one with an inherent floor valuation), among other options.

Stated broadly, various aspects relate to creating a process and system that manages dynamic updating of securitization elements, trading and execution of stocks, and generation of the underlying instruments that link a Talented Person's earning potential backed by one or more insurance policies to a tradable stock. The tradable stock itself is a unique technologically based digital object. The digital object is configured to encode various elements of the Talent's profile (e.g., earning/risk analysis, etc.), encode securitization elements (e.g., risk prevention policies, etc.), and encode ownership. The encoding is configured such that any owner/purchaser can validate the digital object based on the included encoding. The profile can be verified, the securitization can be verified, and the ownership can all be verified by the self-validating digital object via the specialized encryption of the foregoing and/or respective digital signatures associated with the foregoing (e.g., via verifiable digital signatures and encryption in one example).

According to one embodiment, generation and maintenance of the self-validating digital objects significantly improves over known systems. In one example, the self-validating digital object represents a significant departure from the distributed ledger uses in systems such as Bitcoin, where transaction records are distributed through multiple ledgers and validation/verification requires participation of multiple parties. The various embodiments employing self-validating digital objects improve over known approaches by increasing security over known approaches, reducing computational complexity (e.g., the holder of the object can validate all parameters without distributed ledger validation (like Bitcoin) and eliminating the need for massive core ledgers (like conventional transaction systems) and instead allow the use of distributed ledgers that can be accessed by system participants (e.g., to access transaction that they have participated in). Further, implementations reduce the data storage requirement over conventional approaches by encoding verifiable information (e.g., complete records) into individual digital objects and a distributed ledger that form the basis of exchange on the system.

In further embodiments, executable programming can be encoded in the digital object as well. The executable programming enables the system to act on events automatically and in near real time. Various programmatic monitors integrate with third party systems and identify triggering events in near real time. The triggering events are matched to respective encoded executable programming. For example, the triggering event can be an accident or career ending injury for a Talented person. The programmatic monitors (e.g., daemon processes, server monitors, web crawlers, image processors, video processor, audio processors, natural language processor, etc.) can be executed to capture and process data in real or near real time to identify triggering events and executed associated operations.

Various embodiments of the systems and methods are configured to dynamically track a plurality of data inputs (generically fitness information that can include, e.g., news feeds crawled for information, live game or performance data can be actively monitored, digital presence (including for example, new advertisements featuring the Talents are identified in real time), health information, age adjustments, injury information (including for example, length of injury, severity of injury, etc.) and build dynamically a model and/or quantitative view of Talent value—and that view can be risk balanced to account for the clients participating in an exchange based on the Talent value.

According to various embodiments, the Talented Person or Talent may be a professional athlete, entertainer, entrepreneur, or other individual with large or exceptional expected lifetime earnings. The insurance policy products could be life insurance, disability insurance, loss value insurance, or other insurance products. Upon the Talent's registration into the system, a new entity dedicated to the Talent can be formed. The Talented Person contributes into the entity a predetermined percentage of the Talent's future earnings. Then the Talent, who is a crucial person in the business, pays a premium to one or more insurance products to cover him/herself, as a key person in the new entity. The entity is a beneficiary of the insurance policy. The Talent may invest the remaining funds in any selected investment plans available in the system. Insurance claims can be paid out as dividends to the entity. The system can establish a separate entity for each Talented Person. Each separate entity can have all company privileges. The new entity, like any company, has shareholders equity. The system and process is embodied in a variety of exchange systems that include advanced algorithmic analysis that links the data and information that is available on the Talent into every part of the system.

The advanced analysis is specially configured to track data points and available data sources on the Talent in real time. Various processing elements can extract data from broadcasts of real time events (e.g., football games, baseball games, concerts, performances, races, etc.) and update a constantly evolving data model of the Talent's value, risk characteristics, etc., and operate to automatically adjust value mitigation devices. Specifically, the system can automatically update insurance policies on Talent in real time as data is captured, models update, and value/risk analysis changes based on real time data analysis.

Underlying the systems and methods for managing a talent exchanges are the Talent on whom value is derived. For example, the Talented Person after certain time can be able to issue an initial public offering (IPO) backed by the new entity. This process will transform the raw material, which in this case is the paid premium or investments accumulated in the Talented Person's entity, into a new product, which in this case are the digital stocks. The stocks are listed for purchase and/or trading on an execution platform, and the stocks can be visible to everyone visiting the platform. According to one embodiment, initially only the registered individual (e.g., Talent) or brokers are able to buy or sell the stocks. Once a Talent is registered on the system and the tradable objects encoded, the digital stocks can be treated like any current tradable securities (although the underlining stock itself, security, and validation operations differ greatly from conventional trading approaches, as discussed herein). In various implementations, the data and information underlying the stock can be transferred instantly by the system, and the analysis executed by the system can also be transferred to third parties, such as broker platforms, financial platforms like Bloomberg, or news media.

Accordingly, various aspects provide an exchange platform incorporating a web-based and app-based exchange, linked to a trading platform designed to allow investors to invest in stocks linked to the future earnings of Talents. The platform is further configured to match the Talent with investment products, including insurance and investment portfolios.

According to one aspect, a distributed computer system is provided. The system comprises at least one processor operatively connected to a memory, the at least one processor configured to execute a plurality of system components, the plurality of system components comprising: a data collection component, executed by the at least one processor, configured to: search, collect, and store performance information associated with a talent; a data analysis component configured to: generate an output indicating a sentiment of at least a first portion of the performance information; generate an output of predicted future earnings of the talent using at least a second portion of the performance information; an output grading component configured to calculate a risk level for the talent as a function of at least one output of the data analysis component, wherein the risk level is a value greater than or equal to a lower risk limit and less than or equal to an upper risk limit; a selection component configured to: select a set of one or more plans for the talent based at least in part on the risk level; receive an input from the talent specifying at least one selected plan from the set of one or more plans, wherein the input specifying the at least one selected plan includes a digital signature of the talent; verify identity of the talent based at least in part on the digital signature; and encode at least one execution function and the digital signature in a digital object responsive to verifying the identity of the talent, wherein the execution function is configured to automatically execute at least one action associated with the at least one selected plan responsive to meeting at least one condition.

According to one embodiment, the selection component is further configured to request approval from a provider of the at least one selected plan if the risk level is greater than a threshold risk level; and encode the at least one execution function and the digital signature in the digital object responsive to receiving the approval from the provider of the at least one selected plan. According to one embodiment, the plurality of system components further comprise an even monitoring component configured to determine whether at least one portion of the performance information indicates that the at least one condition is met. According to one embodiment, the at least one execution function executes the at least one action responsive to the event monitoring component determining that the at least one portion of the performance information indicates that the at least one condition for the at least one action is met.

According to one embodiment, the plurality of system components further comprise: a share encoding component configured to: generate a share contract wherein the share contract specifies a contract in which the talent agrees to give a percentage of income of the Talent to an entity; receive an input from the talent specifying agreement to the share contract, wherein the input includes the digital signature of the talent; verify the identity of the talent based at least in part on the digital signature; encode a share function and the digital signature in the digital object responsive to verifying the identity of the talent, wherein the share function calculates the income of the talent and transmits the percentage of the income to the entity. According to one embodiment, the digital object comprises a stock of an entity, wherein the stock of the entity comprises a share of ownership of the entity.

According to one embodiment, the plurality of system components further comprise an exchange component configured to: encode, in the digital object, an identity of a current owner of the digital object. According to one embodiment, the exchange component is further configured to: receive a request to execute a transaction, wherein the transaction comprises transferring ownership of the digital object from a seller of the digital object to a buyer, the request comprising an amount of money to transfer from an account of the buyer to an account of the seller, a digital signature of the buyer, and a digital signature of the seller; verify, responsive to receiving the request to execute the transaction, that the account of the buyer includes the amount of money; verify, responsive to receiving the request to execute the transaction, that an identity of the seller of the digital object matches the identity of the current owner of the digital object; automatically execute the transaction, responsive to verifying that the account of the buyer includes the amount of money and that the identity of the seller matches the identity of the current owner of the digital object, wherein executing the transaction comprises modifying the identity of the current owner of the digital object to an identity of a second owner of the digital object and transferring the amount of money from the account of the buyer to the account of the seller, wherein the second owner of the digital object is the buyer; and automatically encode a record of the transaction responsive to executing the transaction.

According to one embodiment, the exchange component is further configured to: encode the record of the transaction in at least one block; store the at least one block in a current distributed ledger to generate an updated distributed ledger; and replicate the updated distributed ledger to a plurality of users. According to one embodiment, the exchange component is further configured to: encode a record of owners of the digital object, wherein the record includes every owner of the digital object from an original owner of the digital object to the current owner of the digital object.

According to one aspect a method for managing a talent exchange is provides. The method comprises searching, collecting, and storing performance information associated with a talent; generating an output indicating a sentiment of at least a first portion of the performance information; generating an output of predicted future earnings of the talent using at least a second portion of the performance information; calculating a risk level for the talent as a function of at least one output of the data analysis component, wherein the risk level is a value greater than or equal to a lower risk limit and less than or equal to an upper risk limit; selecting a set of one or more plans for the talent based at least in part on the risk level; receiving an input from the talent specifying at least one selected plan from the set of one or more plans, wherein the input specifying the at least one selected plan includes a digital signature of the talent; verifying identity of the talent based at least in part on the digital signature; and encoding at least one execution function and the digital signature in a digital object responsive to verifying the identity of the talent, wherein the execution function is configured to automatically execute at least one action associated with the at least one selected plan responsive to meeting at least one condition.

According to one embodiment, the method further comprises requesting approval from a provider of the at least one selected plan if the risk level is greater than a threshold risk level; and encoding the at least one execution function and the digital signature in the digital object responsive to receiving the approval from the provider of the at least one selected plan. According to one embodiment, the method further comprises determining whether at least one portion of the performance information indicates that the at least one condition is met. According to one embodiment, at least one execution function executes the at least one action responsive to the determining that the at least one portion of the performance information indicates that the at least one condition for the at least one action is met.

According to one embodiment, the method further comprises generating a share contract wherein the share contract specifies a contract in which the talent agrees to give a percentage of income of the talent to an entity; receiving an input from the talent specifying agreement to the share contract, wherein the input includes the digital signature of the talent; verifying the identity of the talent based at least in part on the digital signature; encoding a share function and the digital signature in the digital object responsive to verifying the identity of the talent, wherein the share function calculates the income of the talent and transmits the percentage of the income to the entity.

According to one embodiment, the digital object comprises a stock of the entity, wherein the stock of the entity comprises a share of ownership of the entity. According to one embodiment, the method further comprises encoding, in the digital object, an identity of a current owner of the digital object. According to one embodiment, the method further comprises receiving a request to execute a transaction, wherein the transaction comprises transferring ownership of the digital object from a seller of the digital object to a buyer, the request comprising an amount of money to transfer from an account of the buyer to an account of the seller, a digital signature of the buyer, and a digital signature of the seller; verifying, responsive to receiving the request to execute the transaction, that the account of the buyer includes the amount of money; verifying, responsive to receiving the request to execute the transaction, that an identity of the seller of the digital object matches the identity of the current owner of the digital object; automatically executing the transaction, responsive to verifying that the account of the buyer includes the amount of money and that the identity of the seller matches the identity of the current owner of the digital object, wherein executing the transaction comprises modifying the identity of the current owner of the digital object to an identity of a second owner of the digital object and transferring the amount of money from the account of the buyer to the account of the seller, wherein the second owner of the digital object is the buyer; and automatically encoding a record of the transaction responsive to executing the transaction.

According to one embodiment, encoding the record of the transaction comprises: encoding the record of the transaction in at least one block; storing the at least one block in a current distributed ledger to generate an updated distributed ledger; and replicating the updated distributed ledger to a plurality of users. According to one embodiment, the method further comprises encoding a record of owners of the digital object, wherein the record includes every owner of the digital object from an original owner of the digital object to the current owner of the digital object.

According to one aspect a distributed computer system is provided. The system comprises at least one processor operatively connected to a memory, the at least one processor configured to execute a plurality of system components; a data collection component, executed by the at least one processor, comprising: a web crawler component configured to search for and store textual web content related to a talent; at least one application program interface configured to: receive and store statistical data related to the talent; receive at least one video clip of the talent; receive news information about the talent; a data analysis component comprising: a sentiment analysis component configured to process the textual web content and determine a negative, neutral, or positive output; a convergence network component configured to process the at least one video and determine a negative, neutral, or positive output; a modeling component configured to generate predicted future earnings of the talent as a function of the statistical data; an output grading component configured to calculate a risk level for the talent as a function of one or more of the output of the sentiment analysis component, the output of the convergence network component, and the output of the predicted future earnings, wherein the risk level is a value greater than or equal to a low risk limit and less than or equal to an upper risk limit; a selection component configured to: select a set of one or more plans for the user based on the risk level; receive an input from the talent specifying a selected insurance plan from the set of one or more insurance plans, wherein the input specifying the selected insurance plan includes a digital signature of the talent; verify that the digital signature maps to an identity of the talent by checking a mapping of digital signatures to identities, wherein an authorization component maintains a mapping of a plurality of digital signatures to a plurality of identities; and encode at least one claim execution function and the digital signature in a digital object responsive to verifying that the digital signature maps to the identity of the talent, wherein the claim benefit execution function, when executed, is configured to transmit money received from a claim benefit of the selected insurance plan to an entity.

According to one aspect a non-transitory computer-readable medium is provided. The computer-readable medium including instructions that when executed cause at least one processor to perform a method for managing a talent exchange. Various embodiments of the computer-readable medium a configured to execute any one or more or any combination of the method steps discuss above.

According to one aspect, a data object generation system is provided. The system comprises at least one processor operatively connected to a memory, the at least one processor configured to execute a plurality of system components, the plurality of system components comprising: a generation component configured to: generate a plurality of digital objects associated with a first high income entity, the plurality of digital objects associated with a projected earnings over time for the high income entity; encode, within respective ones of the plurality of digital objects, validation information for verifying participation and acceptance by the first high income entity; encode, within the respective ones of the plurality of digital objects, validation information for a risk assessment associated with the first high income entity and corresponding risk mitigation parameters; encode, within the respective ones of the plurality of digital objects, validation information for a record of ownership of the respective digital object from original to current owner; encode, within respective ones of the plurality of digital objects, programmatic execution information, wherein at least a first executable program specifies fitness conditions associated with the first high income entity and further specifies execution parameters for the system to automatically execute in response to determining the fitness conditions associated with the first high income entity are met; and communicate the plurality of digital objects to an execution component.

According to one embodiment, the generation component is further configured to encode, within respective ones of the plurality of digital objects, validation information for a risk assessment associated with the first high income entity and corresponding risk mitigation parameters. According to one embodiment, the generation component is further configured to encode a complete record of ownership for a respective digital object within the respective digital object. According to one embodiment, the generation component is further configured to digitally encrypt ownership information, wherein the encrypted ownership information is verifiable by subsequent owners or validators based at least in part on the encoded information within the digital object. According to one embodiment, the generation component is further configured to build the encrypted ownership information based at least in part on publically available keys and digital signatures associated with ownership transfer.

According to one embodiment, the execution component is configured to enable transfer of at least one of the plurality of digital objects from a first party to a second party. According to one embodiment, the execution component is further configured to encode a record of the transfer in a distributed ledger. According to one embodiment, the system further comprises a monitor component configured to automatically search for information associated with the first high income entity. According to one embodiment, the monitor component is further configured to monitor scheduled events associates with the high income entity and automatically execute monitor processes responsive to a type of scheduled event.

According to one embodiment, the type of scheduled event includes at least one broadcast or webcast event, and the monitor processes includes at least one audio and visual processing application. According to one embodiment, the at least one audio and visual processing application is configured to analyze broadcast or webcast information to determine, in near real time, fitness events associated with the first high income entity. According to one embodiment, the generation component is further configured to generate a plurality of digital objects associated with a second high income entity, the plurality of digital objects associated with a projected earnings over time for the second high income entity, wherein the plurality of digital objects encode validation information for participation, risk assessment, and ownership, and wherein the plurality of digital objects include programmatic execution information.

According to one embodiment, the generation component is further configured to generate a plurality of digital objects associated with a third high income entity, the plurality of digital objects associated with a projected earnings over time for the third high income entity, wherein the plurality of digital objects encode validation information for participation, risk assessment, and ownership, and wherein the plurality of digital objects include programmatic execution information. According to one embodiment, the generation component is configured to generate a plurality of digital objects associated with a plurality of high income entities, the plurality of digital objects associated with projected earnings over time for the plurality of high income entities, wherein the plurality of digital objects encode validation information for participation, risk assessment, and ownership, and wherein the plurality of digital objects include programmatic execution information.

According to one embodiment, the system further comprises an analysis component configured to dynamically assess a risk profile associated with the first high income entity. According to one embodiment, the system is configured to manage redemption and reissue of the plurality of digital objects responsive to changes in at least one of risk profile, the projected earnings, and the fitness conditions for the first high income entity. According to one embodiment, the system is configured to manage the redemption and reissue based, at least in part, on generating new programmatic execution information, and encoding the new programmatic execution information into the reissued plurality of digital objects.

According to one embodiment, the new programmatic execution information includes at least a second executable program that specifies fitness conditions associated with the first high income entity and further specifies execution parameters for the system to automatically execute in response to determining the fitness condition associated with the first high income entity are met.

According to one aspect a computer implemented method for managing a talent exchange is provided. The method comprises generating a plurality of digital objects associated with a first high income entity, the plurality of digital objects associated with a projected earnings over time for the high income entity; encoding, within respective ones of the plurality of digital objects, validation information for verifying participation and acceptance by the first high income entity; encoding, within the respective ones of the plurality of digital objects, validation information for a risk assessment associated with the first high income entity and corresponding risk mitigation parameters; encoding, within the respective ones of the plurality of digital objects, validation information for a record of ownership of the respective digital object from original to current owner; encoding, within respective ones of the plurality of digital objects, programmatic execution information, wherein at least a first executable program specifies fitness conditions associated with the first high income entity and further specifies execution parameters for the system to automatically execute in response to determining the fitness conditions associated with the first high income entity are met; and communicating the plurality of digital objects to an execution component.

According to one embodiment, the method further comprises encoding, within respective ones of the plurality of digital objects, validation information for a risk assessment associated with the first high income entity and corresponding risk mitigation parameters. According to one embodiment, the method further comprises encoding a complete record of ownership for a respective digital object within the respective digital object. According to one embodiment, the method further comprises digitally encrypting ownership information, wherein the encrypted ownership information is verifiable by subsequent owners or validators based at least in part on the encoded information within the digital object.

According to one embodiment, the method further comprises building the encrypted ownership information based at least in part on publically available keys and digital signatures associated with ownership transfer. According to one embodiment, the execution component is configured to enable transfer of at least one of the plurality of digital objects from a first party to a second party. According to one embodiment, the method further comprises encoding a record of the transfer in a distributed ledger.

According to one embodiment, the method further comprises automatically searching for information associated with the first high income entity. According to one embodiment, the method further comprises monitoring scheduled events associated with the high income entity and automatically executing monitoring processes responsive to a type of scheduled event. According to one embodiment, the type of scheduled event includes at least one broadcast or webcast event, and the monitoring includes processing audio and visual information. According to one embodiment, the processing audio and visual information comprises analyzing broadcast or webcast information to determine, in near real time, fitness events associated with the first high income entity.

According to one embodiment, the method further comprises generating a plurality of digital objects associated with a second high income entity, the plurality of digital objects associated with a projected earnings over time for the second high income entity, wherein the plurality of digital objects encode validation information for participation, risk assessment, and ownership, and wherein the plurality of digital objects include programmatic execution information. According to one embodiment, the method further comprises generating a plurality of digital objects associated with a third high income entity, the plurality of digital objects associated with a projected earnings over time for the third high income entity, wherein the plurality of digital objects encode validation information for participation, risk assessment, and ownership, and wherein the plurality of digital objects include programmatic execution information.

According to one embodiment, the method further comprises generating a plurality of digital objects associated with a plurality of high income entities, the plurality of digital objects associated with projected earnings over time for the plurality of high income entities, wherein the plurality of digital objects encode validation information for participation, risk assessment, and ownership, and wherein the plurality of digital objects include programmatic execution information. According to one embodiment, the method further comprises dynamically assessing a risk profile associated with the first high income entity.

According to one embodiment, the method further comprises managing redemption and reissue of the plurality of digital objects responsive to changes in at least one of risk profile, the projected earnings, and the fitness conditions for the first high income entity. According to one embodiment, the method further comprises the redemption and reissue based, at least in part, on generating new programmatic execution information, and encoding the new programmatic execution information into the reissued plurality of digital objects. According to one embodiment, the new programmatic execution information includes at least a second executable program that specifies fitness conditions associated with the first high income entity and further specifies execution parameters for the system to automatically execute in response to determining the fitness condition associated with the first high income entity are met.

According to one aspect a non-transitory computer-readable medium is provided. The computer-readable medium including instructions that when executed cause at least one processor to perform a method for managing a talent exchange. Various embodiments of the computer-readable medium a configured to execute any one or more or any combination of the method steps discuss above.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment in any manner consistent with at least one of the objectives, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. Various aspects, embodiments, and implementations discussed herein may include means for performing any of the recited features or functions.

BRIEF DESCRIPTION OF THE FIGURES

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of a particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

FIG. 11 is an example block diagram of an insurance selection system which may be used in certain embodiments;

FIG. 12 is an example of an investment selection menu, according to one embodiment;

FIG. 13 is an example screen capture for enrollment, according to one embodiment;

FIG. 14 is an example encoding of smart contracts in a digital object, according to one embodiment;

FIG. 17 is an example of pseudocode, in accordance with some embodiments;

FIG. 20 is an example screen capture for insurance contract enrollment, according to one embodiment;

FIG. 21 is an example of pseudocode for a digital object pending contract enrollment, according to one embodiment;

FIG. 22 is an example screen capture for customer feedback, according to one embodiment;

DETAILED DESCRIPTION

Figure 1:
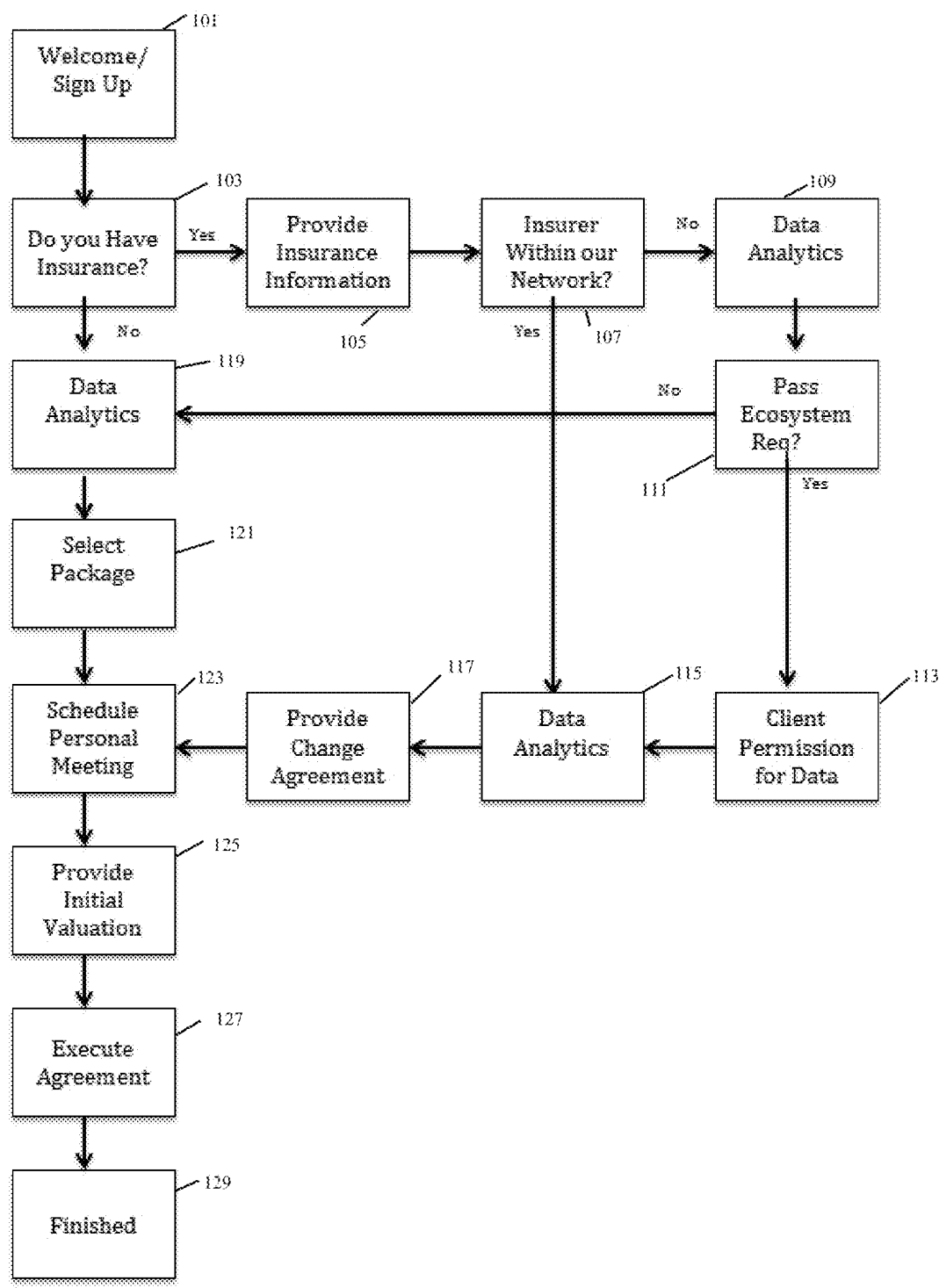
FIG. 1 is an example process flow to initialize Talent, according to one embodiment.

Various aspects of the talent exchange system leverage encoding of transaction history and executable programming tied to monitored events into a distributed ledger and tradable digital objects. Further aspects include monitoring systems to facilitate automatic execution of the executable programming. Thus, contrary to conventional exchange execution, the digital objects encode the stocks traded in the exchange and play an integral part in the entire trading life cycle, including the monitoring and settlement activities of the exchange. The digital objects encoding the stocks can form digital stocks. In a departure from conventional approaches (i.e., instead of stocks being a number (or volume) added or routed to the exchanges from the back office), a digital stock object includes stock record (ownership) information and further, executable programming (e.g., which can be verified by the parties subject to the programming), that enable transparency and introduce new functionality and tools previously unavailable for participants in conventional exchanges. Additionally, all records of transactions of digital stocks can be stored in a distributed ledger. Further embodiments use the transparency of the digital object (and encoded information) and the distributed ledger for monitoring and verifying all transactions. Moreover, regulators can get access to the network to acquire information and confirm compliance for any member.

According to one embodiment, the system will decrease overhead cost over conventional approaches. For example, based on a distributed architecture of the system and the encoding within the traded digital objects, intermediaries required in conventional exchanges can be eliminated. The requirement of clearing and settlement in a centralized fashion increases the vulnerability of conventional systems (e.g., to hacking) and increases both the transactional and computational burden in running the conventional exchange. In some embodiments, the distributed ledger reduces computational burden on system elements improving the efficiency of the system over conventional approaches, among other advantages.

Further, the architecture of the system eliminates the need for a central intermediary reducing the complexity of the system and increasing security. In further examples, the computations and technical efforts in reporting and regulatory compliance are virtually eliminated relative to conventional approaches. For example, all the information necessary for regulatory compliance is made accessible within our network. In yet another example, the larger the scope of the system (e.g., as the members within the network grow) the less of a need for an expensive database or backup database, because all records are stored in a distributed ledger that is replicated to a plurality of users. Further verifications may also occur on information encoded in the stock itself (e.g., current owner information).

Embodiments discussed herein improve upon current distributed financial transaction systems. Some embodiments of the current invention maintain a system of authorized and trusted users. As a result, transactions can be settled and verified faster than conventional approaches (like Bitcoin). This eliminates any need for computations associated with proof of work validation and eliminates any need for token rewards for this validation work. Distributed ledgers herein may have all users with common interests and thus the users can validate their transactions without requiring tokens as a reward. The system administrators can also validate execution of transactions.

FIG. 1 is one embodiment of a process flow 100 to initialize new Talent into the talent exchange system. The process flow 100 begins with a welcome or a sign up 101 displayed to the user in a user interface. In one embodiment, the welcome or sign up 101 can include a welcome or sign up registration web page on an Internet website, or a registration interface on a mobile application in which the new Talent may enter information. Upon receiving the registration information from the welcome or sign up 101, the system checks whether the new Talent has insurance 103. The system may determine whether the new Talent has insurance, for example, based on information received from the welcome or sign up 101. In some embodiments, the Talent can supply user name and access information, and the system can execute an application programming interface (API) to connect with a specified insurer and then determine or validate insurance information, etc.

If the new Talent has insurance 103 Yes, the new Talent provides the insurance information to the exchange system 105. In some embodiments, the new Talent can provide this information by, for example, entering it into a form on a web page, or entering it into a form on a mobile application. Upon receiving the information, the system checks whether the insurance provider is within a network of the talent exchange system 107. In one embodiment, the system can check whether the insurance provider is in the network by determining whether the name of the insurance provider is in a list of names of insurance providers in the network or by querying a database of known providers.

If the insurer is within the network 107 Yes, the system can perform data analytics using information about the insurance provider and the new Talent's policy 115. The data analytics of step 115 can, for example, be executed using a data analytics systems shown in FIG. 2 and insurance selection system shown in FIG. 4. In one embodiment, the system may, for example, use an API to retrieve information about the insurance provider and policy from the insurance provider's database. The system can then use a series of data analytic algorithms to process the data 115. For example, based on an analyzed level of risk (e.g., machine regression on player data can be used to determine riskiness (e.g., based on player position, history of injury, history of injury for a position, games played, age, predictive injury, severity of actual injury, likelihood of severe injury, number of performance per time period, history of missing performances, correlated history of other performers and missed performances, etc.). Other machine learning approaches can be used (e.g., fitting or optimization analysis, etc.). Based on the level of riskiness, the system can automatically determine a risk minimization strategy, so that for example, current owners of the Talent's stock are paid regardless of injury, failure to perform, etc.

If, however, the insurance provider is not within the network 107 No, the system acquires information about the insurance provider and analyzes the information 109. The system may, for example, execute step 119 using a data analytics system such as one shown in FIG. 2. The system can, for example, acquire the information using an API to request access and retrieve information related to the insurance provider and about a policy of the new Talent with the insurance provider.

According to one embodiment, the system then determines whether the insurance provider passes ecosystem requirements 111 (e.g., based on riskiness assessment and projected income, whether sufficient mitigation is in place). The system may perform analytics on the data acquired about the insurance company to determine if they meet the ecosystem requirements 111. For example, the provider itself is analyzed by the system to determine if the provider is likely to pay out on a policy or likely to deny coverage or event declare bankruptcy in response to claims. For example, system monitor processes discussed below can be tasked with collecting information on providers to determine payout profiles—and the system can incorporate an evaluation of non-payment risk into riskiness assessments of Talent discussed herein.

If it is determined that the insurance provider and policy do pass the ecosystem requirement 111 Yes, the system proceeds to request permission to access data from the insurance provider 113. In one embodiment, the system explicitly requests client permission to access their insurance data 113. In one example, requesting permission includes obtaining username and password to access the data from the insurance provider through an API.

Upon receiving data from a current insurance provider of the new Talent from either a provider within the network 107 Yes or receiving data from a provider outside the network that passes the ecosystem requirements 113, the system executes data analytics 115. The system may, for example, use a series of data analytic algorithms to process the data received from the insurance provider. In one embodiment, the data analytics can be used to determine a deviation between optimal coverage and the current coverage. Upon completing the data analytics and determining additional coverage or changes that are required 115, the system provides a change agreement 117. In one embodiment, the change agreement can comprise a collection of one or more changes in the current coverage to overcome the deviations from the optimal coverage. Furthermore, the system can present the change agreement to the new Talent on a web page or an interface of a mobile application.

If the system finds that the new Talent does not have insurance 103 No or determines that the new Talent's current insurance provider does not meet ecosystem requirements 111 No, it proceeds to execute data analytics 119 to select an insurance provider 121. The data analytics and selection of step 119 may, for example, be executed using the example data analytics system of FIG. 2. In one embodiment, the system may use one or more APIs to collect data about the new Talent and possible insurance providers. In some embodiments, the system may collect data about the new Talent from one or more of sports news websites, social media networks, fantasy sports websites, and other sources of information about the new Talent. The system then uses results from the data analytics to select an insurance package for the new Talent 121. The system may use a data analytics system such as one illustrated in FIG. 2 in an insurance selection system such as one illustrated in FIG. 4 to execute step 121. In some embodiments, the system can use machine learning algorithms to select a set of one or more optimal insurance packages for the new Talent to select from based on a risk level associated with the Talent.

After selecting an insurance package 121 or providing a change agreement to an existing insurance provider's policy 117, the system proceeds to determine an initial valuation 125. In some embodiments, the system can aid in the calculation of initial valuation by way of the data collected about the new Talent as well as data regarding the selected insurance package or change agreement. The system may, for example, use machine learning algorithms to calculate expected long term returns and expected future earnings which can be used to determine an initial valuation. In some embodiments, to communicate the initial valuation to the new Talent 125, the system may present the initial valuation on a webpage or on an interface of a mobile application. The new Talent may then agree to the initial valuation. The agreement can then be executed outside of the system 127.

Once Talent is initialized into the system, a plurality of digital objects can be associated with the Talent and encoded with any one or more of valuation information, risk information, Talent commitment, insurance information, income share agreements, intellectual property agreements, and programmatic execution information. The shift from conventional architectures (including, for example, encoded digital objects associates with Talent) enables many of the following advantages, and improves the execution of the various embodiments of the platform and/or system that implements them.

According to various aspects there are multiple limitations in current stock exchange systems that limit executional efficiency and impose significant burdens on computational resources and other system resources. Current electronic stock trading systems require input from a trusted intermediary to validate transactions. Furthermore, even the best conventional stock exchange systems require two to three days for clearing and settlement of transactions—these inefficiencies result directly from the computational burdens on the system components and limitation imposed by the system architecture. For example, the manual activities required by conventional systems require significant amounts of back office paperwork for recordkeeping and maintaining of records for future auditing. Current trading systems are also exposed to the possibility of front running in which a party may execute a transaction based on pending orders of another transaction request. For example, a broker may trade assets in his or her account based on advanced knowledge of a pending order from the brokerage firm or from clients. Various embodiments detailed herein eliminate this possibility/vulnerability based, for example, on the architecture and encoding within specialized digital objects (which may be coupled with transactional validation).

Another limitation of current electronic stock exchange systems is that stocks are simply numbers that must be tracked, for example, in back office paperwork. Stocks do not in themselves provide any sort of record tracking, information related to the stock, ownership information, or other features to provide transparency and monitoring capability. Therefore all records of the stock and information relative to the stock must be stored in external databases. Also, as discussed above, current stock exchanges require input from a trusted intermediary. Conventional approaches relegate clearing and settlement to a single centralized and trusted intermediary system. As a result of this centralization, the trusted intermediary is prone to hacking and fraud. Current embodiments discussed herein eliminate this security vulnerability. Additionally, the central trusted intermediary needs a high level of computational power in order to process the volume of transactions that occur. The central system thus becomes a processing bottleneck and an unacceptable failure risk. Current embodiments reduce the computational burden associated with process and provide reduce failure risk. Further, records of all transactions must currently be held in a central database which must be backed up and protected. The backup database storage and cyber security require additional costs and significant resources (e.g., memory, processing, encryption, storage, etc.) in current stock exchange systems. Also, accessing database storage, paperwork, and other information for auditing and regulation adds significant time and cost overhead to existing transaction systems.

It is appreciated that some embodiments discussed herein relate to systems and methods that address problems associated with current stock transaction systems. Some embodiments disclose a distributed system architecture that eliminates the need for a trusted intermediary and further distributes much of the computational burden associated with tracking, record keeping, policing, and other activities required in current stock exchange systems, ultimately delivering an improved computer platform having increased security and reduced risk of failure (when compared to conventional systems). Specific embodiments describe distributed ledger technology to maintain a distributed and transparent record of all transactions in the system. A distributed ledger eliminates the need for a central trusted intermediary to track and validate transactions. As a result, this eliminates the need for powerful centralized computation and central data storage. In a distributed system, members of a network will contribute computational power to expedite execution processes. This makes front running nearly impossible. Also, the lack of centralization makes the overall system very difficult to hack. Given that all transactions are automatically verified, certain embodiments may significantly reduce clearing and settlement time required for current stock exchange systems and eliminate significant amounts of back office paperwork. Furthermore, all transactions and records of ownership can be stored in a distributed ledger that is replicated to a plurality of users. In some embodiments, a complete record of history of ownership of a stock can be encodes in the digital stock itself, enable at least verification of a current owner during a transaction (e.g., even without reference to the distributed ledger). Distributed databases do not need a single physical location or expensive infrastructure. This makes them easy to access for multiple parties and makes them difficult to hack or modify.

It is appreciated that certain embodiments relate to digitization of stocks to create digital objects that significantly improve upon current stock exchange systems. Digital objects such as the digital stocks can significantly improve trading, monitoring, and settlement activities of a stock exchange system. Instead of stocks being a number or volume that must be tracked and recorded in back office paperwork and centralized databases, digital stocks may store records and contracts associated with the stock within the stock itself. This increases transparency and enables all members to monitor and verify information associated with the stock. Moreover, regulators and auditors can easily acquire information related to the stock and can confirm compliance for members of the stock exchange. The digital stocks can be stored as digital objects that maintain a self-validating record of ownership and contracts associated with the stocks. This further reduces computational and storage burden associated with any single entity. In some embodiments, a digital stock may even be encoded with a complete historical record of ownership of the digital stock to increase security and monitoring capabilities.

Current distributed financial transaction systems have additional limitations and problems. Reversibility in current distributed financial transaction systems such as Bitcoin creates a problem because there are no authorized and authenticated individuals to be held accountable when these operations are executed. Thus, regulators do not recognize legality of such systems because any anonymous user can reverse a transaction. Furthermore, Bitcoin relies on "mining" to validate transactions and provide a proof of work for the validation. Miners must decrypt transactions to add them to a distributed ledger and provide a proof of work in order and receive tokens or Bitcoins in return. This proof of work requires computational resources and time that are eliminated via various embodiments discussed herein.

Figure 2:
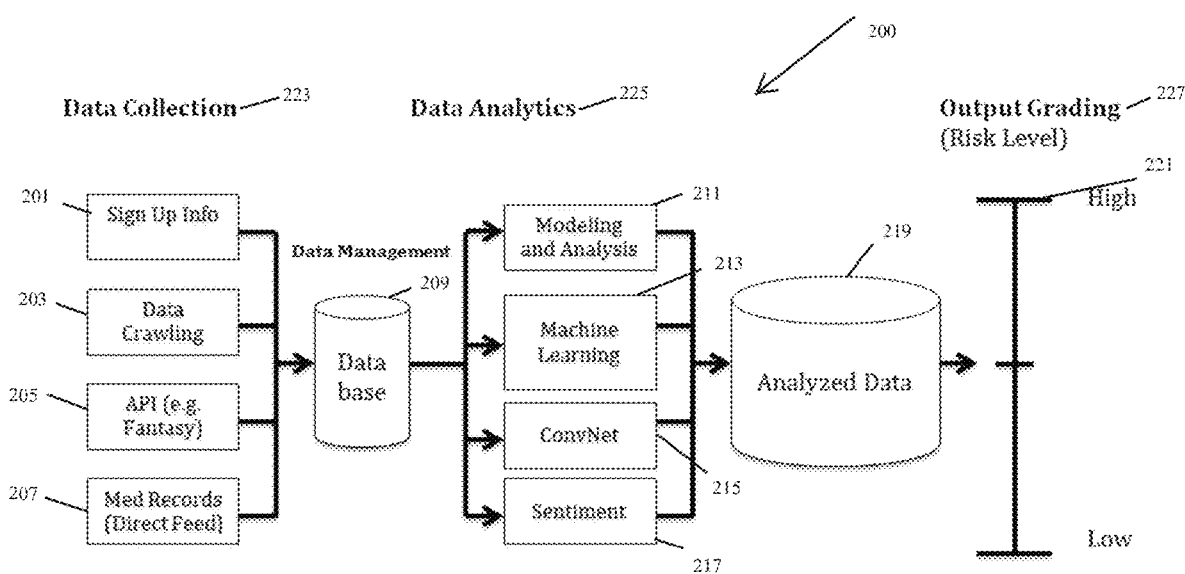
FIG. 2 is a block diagram of an example data analytics system, according to one embodiment.

FIG. 2 illustrates one embodiment of a data analytics system 200. The data analytics system may be used to build a dynamic model and/or quantitative view of the new Talent's value. In one embodiment, the assessment of value can be encoded in a digital object (with other information) and the digital objects can form a medium of exchange for a Talent platform. In one example, the data analytics system can be configured for use in the new Talent registration process of FIG. 1. The system 200 may include a data collection component 223, a database of collected data 209, a data analytics component 225, a database of analyzed data 219, and an output component 227.

In some embodiments, the data collection component 223 is configured to collect data about new Talent from a variety of sources. These sources can include sign up information 201, information collected from automated processes including, for example, data crawling 203, information collected using an API to specific websites 205, and medical records 207. Data collected from these sources may include data related to performance, historical earnings, news, and media.

In one embodiment, the data collection component includes a registration subcomponent 201 configured to collect sign up information. Sign up information can include information entered by the new Talent into a user interface of a website or a mobile application. Sign up information can include, for example, one or more of the new Talent's areas of Talent, personal information, professional sports team, position, income information, endorsements, and investment preferences. Personal information can comprise name, age, weight, height, and education (e.g., high school, college, etc.). Income information can include guaranteed money and contract bonuses, performance bonuses, etc. In other embodiments, the Talent can provide information on ticket sales, royalty income, movie contracts, revenue sharing compensations, etc. The registration subcomponent may be configured to generate several fields in one or more user interface forms of a web site or a mobile application containing a plurality of fields to collect the sign up information. In some embodiments, the system selectively presents relevant fields based on the respective Talent and their position or job type.

The information input into the fields may then be validated by the registration subcomponent to insure that it is valid and authentic. The registration subcomponent can, for example, validate the identity of the new Talent using a personal identification number such as a social security number. The registration subcomponent may compare the received social security number and new Talent name to a secure government database of social security numbers and names. The registration subcomponent can also verify that all the information input by a user is in a valid format. For example, the monitoring processes discussed herein can also be tasked to search for and validate submitted information, from both public and private resources.

According to one embodiment, the data collection component can also include a data crawler, e.g. 203, to collect information. In one example, the data crawler may comprise a web crawler that can, for example, utilize identification information about the new Talent to gather relevant data from the Internet or any publically accessible online source of information. In some embodiments, the data crawling can be automated using a bot. Furthermore, the bot can use natural language processing to parse web page content and select relevant content. For example, the data collection component 223 can monitor news feeds and match on Talent name, field, events, places, and other relevant characteristics of the new Talent to identify potentially relevant material. In some embodiments, the data collection component 223 uses the data crawler, e.g. 203, to collect relevant information by parsing textual content from various news feeds and identify keywords relevant to the new Talent. The data crawler may identify specific key words that indicate risk and value associated with the new Talent. In other embodiments, the data crawling can be executed manually and operations can be made in conjunction with the automated collection processes.

The data collection component 223 can interface with specific sources of information to collect data relevant to the new Talent 205. In one embodiment, the component can utilize APIs 205 to communicate with different websites and collect data about the new Talent. For example, the system can execute a plurality of APIs tailored to respective data sources. Each Talent within the system may be associated with one or more specific API to efficiently capture respective information, and further to monitor data over time.

According to one example, the new Talent may be a professional NFL athlete. In this case, the data collection component can be configured to use one or more APIs to identify and retrieve football statistics from a variety of websites including fantasy sports websites. In one example, the data collection component 223 limits captured data to information that indicates performance information and limits information collected temporally in order to guarantee that the data collected is relevant for valuation and is the most up to date. In other embodiments, the data collection component can be configured to use an API to collect social media posts, news articles, and other Internet content mentioning the new Talent. The component can be configured to identify relevant content by identifying specific key words that indicate risk and value of the new Talent, for example using natural language processing or even machine learning analysis. The data collection component 223 can, for example, parse textual content from various sources to identify key words such as the Talent's name in the content.

The data collection component can also collect medical records about the new Talent 207. In some embodiments, the data collection component contains an API to one or more electronic medical or physical training record systems to request access and receive medical information about the new Talent. In other embodiments, the data collection component can interface with the new Talent's health insurance provider to receive the new Talent's latest medical information.

The data collection component 223 can be configured to collect data from a variety of sources using a variety of methodologies, reformat the data and store it in a database 209. In some embodiments, the database 209 can comprise a relational database of indexed data. In other embodiments, the database can comprise a non-relational database comprising documents which are inserted in the data collection stage 223.

In some embodiments, the data analytics component 225 of system 200 includes various data processing subcomponents to generate data that indicates risk level associated with the new Talent. The data analytics component may comprise a modeling and analysis subcomponent 211, a machine learning subcomponent 213, a convolution neural network subcomponent 215, and a sentiment analysis subcomponent 217.

In some embodiments, the modeling and analysis subcomponent 211 can be configured to use the data collected from the data collection stage 223. In one embodiment, historical performance data of the new Talent is used to characterize how well the new Talent has performed relative in his or her field of competition. This analysis can include, for example for an NFL athlete, average performance statistics such as average touchdowns scored, average yards gained, and other statistics, including Talent's data statistics from college. In other implementations, the data collected and the risk/projected income analysis can be tailored to the type of Talent (e.g., a performer, can be analyzed against ticket sales, number of performances, likelihood to miss events, etc.). The system can even correlate social media posts of excessive partying against scheduled events to evaluate riskiness of behavior (including, for example, arrest record). In one example, the modeling and analysis subcomponent 211 may predict future earnings of the new Talent using multiple variables as inputs to a polynomial function. In a specific example embodiment for NFL quarterbacks, the polynomial may receive inputs of a quarterback's pass completion percentage, number of touchdowns, and number of passes longer than 40 yards for a current season. The polynomial may then be used to calculate expected earnings for an NFL quarterback for the following season. In some implementations, the machine learning algorithm is implemented with multiple independent variables associates with earning prediction (e.g., four, five, six, and seven independent variable models can be executed and used to predict).

The machine learning subcomponent 213 can include various classifiers and regression models that utilize collected data 209 to predict future performance of the new Talent. The classifiers and regression models can, for example, predict future performance of the new Talent. The classifiers and regression models can also predict future earnings of the new Talent based on predicted future performance. The machine learning subcomponent can also execute various algorithms to determine the new Talent's risk level (for example, which may vary based on predicted future earnings). Further, the predictions generated by the machine learning subcomponent 213 can be continually updated with incoming data from the data collection stage 223. The machine learning subcomponent 213 can, for example, use a new Talent's historical performance as an independent variable to predict future earnings. In a case in which the new Talent is an NFL player, the machine learning subcomponent 213 may use several collected parameters about the player and correlate them to future earnings of the player. For example, the system may determine a draft number of the player and predict future earnings based on a calculated correlation of draft number to future earnings. In another example, the system can correlate passing yards and passing touchdowns of a quarterback to future earning potential. The machine learning subcomponent 213 may then calculate a future earnings estimate using this correlation. In another embodiment, the machine learning subcomponent 213 may match a player's statistics with other players' statistics. The machine learning subcomponent 213 may then aggregate the matched players' earnings from a database and average the earnings to predict earnings for the new Talent.

In another example embodiment, the data analytics component 225 can further include a convolution neural network 215. In some embodiments, the convolution neural network can comprise multiple layers of receptive fields (similar to those above) to use data from the data collection stage 223 to output data that indicates risk associated with the new Talent. The data analytics component 213 may, for example, feed video into the convolution neural network to output a parameter. The parameter may comprise a result indicating that the video content was negative, neutral or positive relative to risk associated with the Talent. In other embodiment, the convolution neural network can be used to detect programmatic events associated with the Talent (e.g., injury event during a sports evert, fall of a stage during concert, etc.) and trigger further monitoring and/or automatic responses associates with ROI guaranties made to stock holders.

In one embodiment, the data analytics component 225 can also include a sentiment analysis subcomponent 217. The sentiment analysis subcomponent 217 can use the collected data to extract information from text data stored in the database 209. The sentiment analysis may comprise natural language processing, text analysis, and computational linguistic techniques to parse collected data and extract information 209 relevant to the new Talent. In some embodiments, the extracted information can be used to further determine parameters that indicate risk level associated with the new Talent. The sentiment analysis subcomponent 217 can, for example, process textual content relating to the Talent and output a result indicating sentiment associated with the textual content. In one example, the parameter may comprise a result value of negative, neutral, or positive regarding text information collected about the new Talent. In another example, the sentiment analysis subcomponent 217 can receive social media comments relating to the Talent. The sentiment analysis subcomponent 217 may classify text in the social media comments based on presence of words that indicate sentiment. The sentiment analysis subcomponent may, for example, classify each comment as positive or negative.

In other embodiment, the sentiment analysis can be used to detect programmatic events associated with the Talent (e.g., injury event during a sports evert, fall of a stage during concert, etc.) and trigger further monitoring and/or automatic responses associates with ROI guaranties made to stock holders.

In some embodiments, one or more subcomponents of the data collection component 223 and data analytics component 225 may be encoded in a digital stock. For example, one or more functions associated with the machine learning 213, convergence network 215, and sentiment analysis 217 may be encoded as executable programs in the digital stock. The executable programs may comprise functions to generate analyzed data 219 using, as inputs, data collected from the data collection component 223. The data analytics component 225 may, for example, maintain an overall sentiment value for the Talent. The sentiment value may be calculated in near real time as a function of continuously collected textual web content associated with the Talent. The sentiment value may influence a value of the digital stock and influence decisions to purchase or sell the digital stock.

The output component 227 can be configured to utilize any of the analyzed data 219 or any combination of the analyzed data to output a risk level in the output grading stage 227. The output component may use calculated indicators of risk in the analyzed data 219 to determine a risk level to output. In one embodiment, the output component 227 may generate a grade between a lower limit and an upper limit. The grade may comprise a value on a scale of one to ten wherein one can represent a very low risk and ten can represent a very high risk. Other scales and grading examples can be used in different embodiments. Grading may be calculated based on parameters related to one or more of the following metrics: expected future income, expected career duration, injury risk, quality of life style, commitment to training and performance, social media interaction, scout ranking, and upside or downside potential income. The data analytics component 225 may calculate output parameters related to each metric and store them in the database of analyzed data 219. For example, the output grading component 227 may receive as input grades relating to one or more of the metrics mentioned above. The output grading component 227 may then calculate a weighted average of the grades to output a final grade for the risk level.

Risk levels can be evaluated against a plurality of thresholds, including a first threshold (signifying low risk) at which the system can automatically enroll the Talent and automatically enroll risk mitigation (e.g., insurance packages) to build a stock base for the Talent. Risks can also be evaluated against a second threshold or range of value (e.g., associates with moderate risk) that may benefit from human intervention. In one embodiment, risk assessments falling within the second threshold are referred to a human evaluator to shepherd creation of a stock for a Talent. In yet other embodiments, a third threshold can be used to reject Talent of unacceptable risk (e.g., associated with high risk). Talent associated with high risk can be monitored by the system to re-evaluate risk profile over time and potentially enroll the Talent and generate and associated stock.

In some embodiments the output component can generate a webpage or a screen of a mobile application that displays a risk level to a user. The user can include the Talent, a legal representative of the Talent, or other representative of the Talent. The display can, for example, comprise display a bar with a scale that goes from low to high 221. The display can include a marker on the scale to indicate a level of risk associated with the new Talent. The output component can generate a position of the marker on the scale based on one or more parameters from the analyzed data 219. In other embodiments, the output may also include other visual indicators displayed to a user that indicate long term performance outlook and risk associated with the new Talent 221. The output grading component calculates one or more grade parameters that indicate the value and risk associated with the new Talent.

The output risk level associated with the new Talent 221 can then be used in the new Talent initiation process 100 to provide an insurance change agreement 117 to the new Talent or to select an insurer 121. For providing a change agreement 117, the system can, for example, use the risk parameters to determine an insurance policy that eliminates a delta between current coverage and desired coverage. In some embodiments, the system may utilize the analyzed data 219 to classify the new Talent into a certain insurance policy.

The output risk level associated with the new Talent 221 can also be used to select a new insurer for a new Talent who does not have any current coverage 121. In some embodiments, the output risk level 221 can be utilized to select one or more providers and policies from a plurality of providers and policies. The system can, for example, select one or more providers and policies that predict the highest profit margins based on the analyzed data 219. Upon either selecting one or more new insurer providers 121 or providing a change agreement to the new Talent to modify existing coverage 117, the system can proceed to communicate an initial valuation to the new Talent 125.

Figure 3:
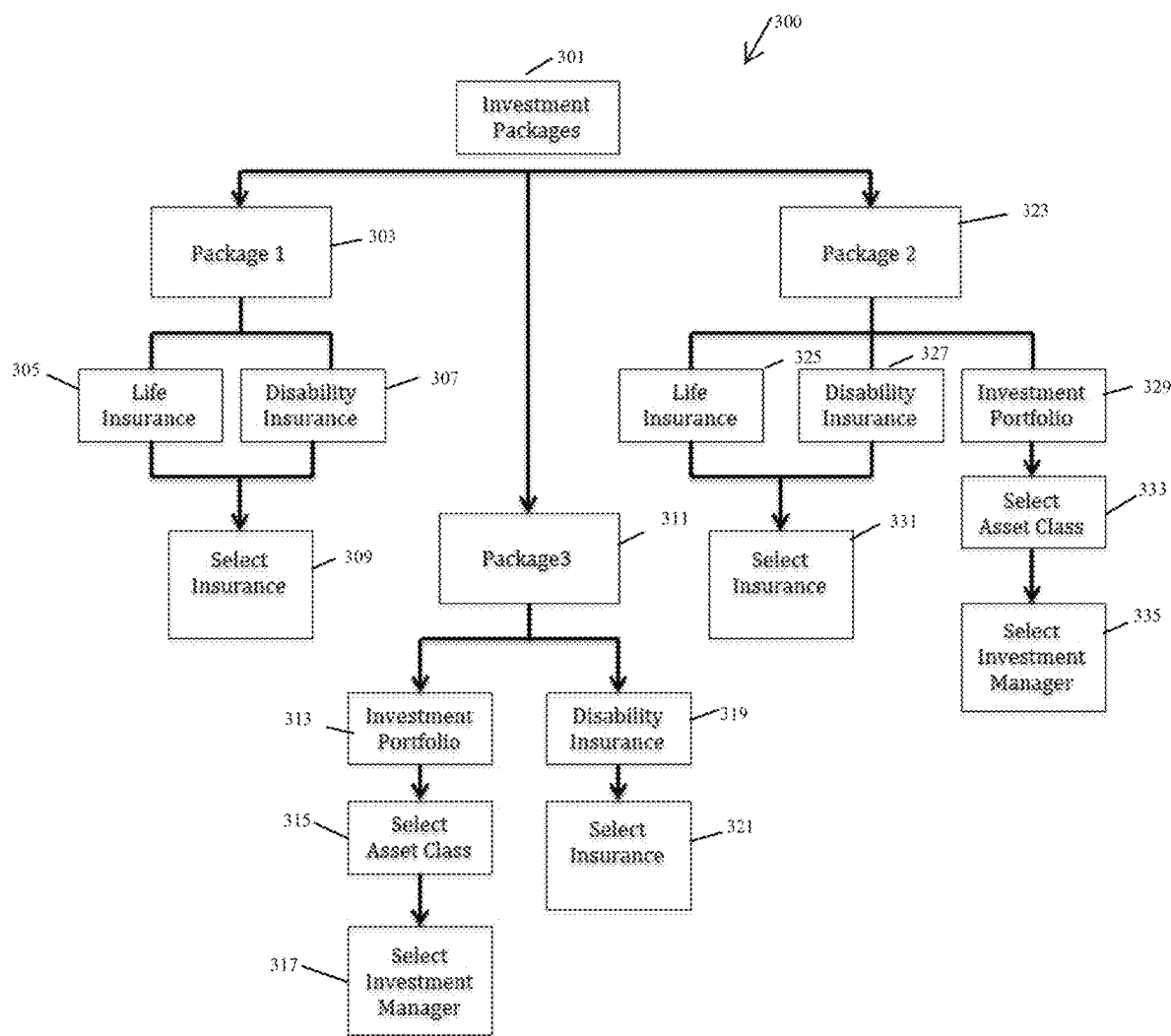
FIG. 3 is an example process flow for investment selection, according to one embodiment.

FIG. 3 is an illustration of one embodiment of a set of investment package options 300 available to a new Talent. In some embodiments, the system may generate a webpage or screen of a mobile application providing a user with one or more investment options. In one example, the system generates three different investment packages 303, 311, 323. The system may generate a webpage or screen of a mobile application providing a user with an option to select one of the three packages.

In one embodiment, a first package 303 can comprise life insurance and disability insurance for the new Talent. The system may receive an input from a user indicating selection of the first package. Upon receipt of this input, the system may automatically initiate selection 309 of a life insurance 305 and disability insurance 307 policy. The system may generate a list of insurance plan options. The system may, for example, present a webpage or mobile application screen displaying a list of insurance plan options and an option to select at least one plan. An example webpage or screen of a mobile application is shown in FIG. 11. In some embodiments, after receiving an insurance plan selection the system may present the user Talent with an insurance contract that the user Talent must accept. For example, the system may generate a webpage or mobile application screen displaying a contract to the user Talent as shown in FIG. 20. The user Talent may be presented with an option to agree. Upon receiving input that the user Talent has accepted, the system may automatically initiate the insurance plans with the insurance providers. The system may further automatically validate enrollment in the insurance plans and encode them as executable programs in a digital stock.

A second investment package 323 can include life insurance 325, disability insurance 327, and an investment portfolio 329. Upon receiving an input indicating selection of the second package 323, the system can automatically initiate selection of life insurance 325 and disability insurance 327. The system may automatically select an investment portfolio or automatically generate a list of options from which the user can select an asset class and manager. The system can, for example, generate a webpage or mobile application screen displaying a list of the investment options and further be configured to allow the user to select an option 329. The system may request the new Talent to select investments 329 within the insurance plan. For example, the system may generate a webpage or mobile application screen displaying a list of asset classes 333 within the insurance plan and an option to select them as illustrated in FIG. 12. According to other embodiment, specific information displayed in the UI may change, including for, a title display shown in the screen may read "Select your investment portfolio," among other options. The system may display historical returns of each investment option and a portfolio manager 335 of each investment option. In some embodiments, the investment manager may comprise one or more of an investor, insurance company, bank, or other party. Upon selection of a portfolio 329 the system may provide the user with a contract. The system may, for example, generate a webpage or mobile application screen that displays to the user legal matters related to the investment portfolio contract 329. Similarly, the system may generate a webpage or mobile application screen to display an insurance contract agreement to the user after selection of insurance plans as illustrated in FIG. 11. When the system receives input from the user indicating acceptance of the investment portfolio contract 329, the system automatically initiates the contract. For example, the system may grant the selected investment manager 335 permissions to manage the investment portfolio of the new Talent 329. Additionally, upon receipt of an agreement to the insurance contract from the user, the system may automatically start the plan with the insurance providers.

A third investment package 311 can include disability insurance 319 and an investment portfolio 313. Upon receipt of a user selection of the third package, the system may initiate selection of a disability insurance policy 321 and an investment portfolio 313. Selecting the investment portfolio may comprise selecting an asset class 315, and investment manager 317 to manage the portfolio 313 as described with respect to package 2. The system may automatically select an investment portfolio or automatically generate a list of options from which the user can select an asset class and manager. The system can, for example, generate a webpage or mobile application screen displaying a list of the investment options and allowing the user to select an option as shown in FIG. 12. The system may also generate a webpage or mobile application screen displaying a list of insurance plan options for the user to select from as illustrated in FIG. 11. Upon receiving selections for the insurance plan and investment portfolio, the system may then provide the new Talent with contract agreements for each. The system can, for example, generate a webpage or mobile application screen to display the contracts and provide an option to the user to accept as illustrated in FIG. 20. In response to the user accepting, the system can automatically initiate the insurance policy with the provider and also grant management permission to the selected investment manager 317.

In some embodiments, upon receiving selection of an insurance plan and/or investment option from a Talent, the system may automatically validate the enrollment and encode the contract as an executable program in a digital stock. The system may automatically validate enrollment, for example, by encoding a digital signature of the Talent with executable program code. This allows any party to verify and validate the Talent's enrollment in the plan. The executable program may comprise a software object. In a specific example, the software code may be configured to calculate a return on investment for a plan. The software code may be further configured to transmit the return on investment to an account of the Talent. In another example, the software object may comprise a function that triggers actions for dividend payouts. The software code may be configured to prompt the Talent for a decision to pay out a dividend or reinvest the dividend. The software code may further be configured to execute the pay out the dividend to an account or reinvest the dividend based on the input response from the Talent.

In another example embodiment, the software code may be configured to trigger redemption actions. The function may be configured to receive an input indicating that the Talent is requesting a redemption. Upon receiving the input, the software code may be configured to generate a prompt to ask for a type of redemption. The software code may, for example, generate a webpage or screen of a mobile application requesting the Talent to specify whether the redemption is a withdrawal or a loan. The software code may further be configured to trigger the redemption according to the Talent's selection and then update a balance account accordingly. In some embodiments, the software code may be configured to calculate a current balance. The software code may, for example, calculate the balance as a sum of the current balance and return on investment minus dividends and redemptions. The software code may further be configured to calculate a total benefit that is equal to the plan's cash value.

In specific embodiments, the software code may also trigger actions related to plans. The software code may, for example, be configured to trigger an insurance claim based on detection that conditions for the insurance claim are met. The software code can be configured to receive current information about the Talent. The information may, for example, comprise news information collected from a web crawler or one or more APIs to news websites. The software code may be configured to analyze the received information to detect whether conditions for a claim are met. If, for example, conditions for a claim are met, the software code may be configured to trigger the insurance benefit and distribute claimed money to an account.

Example pseudo code of software code implemented in a digital stock is shown below. The pseudocode below is shown below for purposes of illustrative example only and not for limitation.

Example Agreement Pseudocode (Embedded in Digital Object):

```
== Start Income Share Agreement Smart Contract ==    // Begin executable flag
                                                     // Define method and target (e.g., "Lebron23")
                                                     // target used by other processes e.g., filter analysis
Certificate Details {
    Title digital stock Certificate                  // e.g., unique Stock ID
    CompanyName Lebron23                             // unique company or entity name
    OwnerName Current Stock Owner                    // maintained in record of ownership
                                                     // as well
}
Income Share Agreement Details {
//**Talent agrees to contribute into the investment a percentage amount of his/her future
//earnings based on his/her TotalIncome as described below**//
    Income Share Agreement {
    //**Talent agrees to contribute into the new entity a percentage of his/her future
    //earnings based on his/her Internal Revenue Service (IRS) report and the calculation
    //below**
    Function IncomeShare( ) {
    IncomeSharePercentage = 10%;                     //based on specific agreement
                                                     //e.g., 10, 15, 20, 25, 30, 35, 40...
    }
}
```

```
Function CalcTotalIncome ( ) {
TalentTotalIncome = Salary/Bonuses + Endorsements + Licensing revenue;
//**Future earnings may include also appearances, memorabilia, book royalties **
// current example provides one implementation of TotalIncome
// other embodiments include probability determinations of projected income and //risk
associated with projections
}
Function InvestmentContribution ( ){
Talent.Contribution(TalentTotalIncome * IncomeSharePercentage);
}
Add Signature {
Signature sig = signature.getsign
Unique Signtaure for each stock         //e.g. encrypted or digital signature
};
    return signature
}
== End Income Share Agreement Smart Contract ==
```

Example Insurance Contract Pseudocode:

```
// Description: Reduce the need for customer engagement and automate key processes within //
the insurance, of which costs can be reduced and claims payments expedited (automated).
== Start Insurance Smart Contract ==
Certificate Details {
   Title digital stock Certificate;
   CompanyName Lebron23;
   OwnerName Current Stock Owner;
}
Insurance Policy {
   LifeInsurance Contract {
      Function InsuranceInvestment ( ) {
      Get.ROI;
      // Based on
      //through Oracles connected with insurer
      // Net of Insurer's fees
      send.ROI(InsuranceBalance);
      }
      Function InsuranceDividends ( ) {
      If Dividend of investment paid out {
      Prompt Talent to select payout or reinvest
         If payout {
            Send.dividendPayout(InsuranceBalance);
            }
         if reinvestment {
         send.DividendReinvestment(InsuranceBalance);
            }
      else if {
      send.Dividend(InsuranceBalance);
      //default option to reinvest if no response
      }
      }
      Function InsuranceRedemption ( ) {
      // If Talent request to redeem
      // Prompt to ask redemption in form of withdrawals or loan
         If withdrawals {
            Verify from insurer funds availability
            Send.withdrawals(InsuranceBalance);
            }
         if loan {
            Verify from insurer funds availability
            Send.loan(InsuranceBalance);
            }
      }
      Function InsuranceBalance ( ) {
      CurrBalance + ROI - dividends - redemptions = new.balance;
      //"Death Benefit Calculation"
      faceAmount (+/-) policy' s Cash Value = totalDeathBenefit;
      //** the increase/decrease of death benefit will depend on a number of factors
      //such as the return on investment or if there were any withdrawals. The //addition
      or reduction of policy's Cash Value can be sent from insurer to the //contract.**
      }
      Function LifeClaim ( ) {
      Get.Talent.Data.News;
      //**get data and news feed from verified sources, via Oracles, about the Talent //to
      verify the eligibility of Disability claim. **
```

```
   If Talent passed away
   pay.Talent(totalDeathBenefit);
   }
 DisabilityInsurance Contract {
   function Claim ( ) {
   DisabilityClaim = $20,000,000;
   // disability claim target calculated and enrolled by the system based on ROI
   // and/or Total Income calculation – in some embodiments, disability claims
   // includes progressive coverage and temporally based claim amounts (e.g.,
   // increased //over career (e.g., may also include regressive amounts after
   // time (e.g., after peak performance period for athlete)
   Get.Talent.Data.News;
   //**get data and news feed from verified sources, via Oracles, about the Talent //to
   verify the eligibility of Disability claim. **
   // crawler processes
   //      Autoconfirm {
   //          //Trigger search on Talent or company name
   //                  crawler.(companyname) filter <injury event>
   //                              test eligibility.criteria    // injury, broken bone
   //                                                           //natural language
   //                                                           analogue for injury
   //                  videoanalysis.(companyname) filter <injury event >
   //                                                           // video stream analysis
   //                                                           // (live or playback)
   //                              test eligibility.criteria filter <injury event >
   //                                                           // analyze video for injury
   //                                                           //event
   //                  healthproviderAPI.(companyname) filter <injuryevent >
   //                                                           // monitor and
   //                                                           //confirm with
   //                                                           //medical report
                                   test eligibility.criteria filter <injury event >
                                                                // analyze medical report to
                                                                confirm injury event
   //
   //         Confirm injury disability in multiple sources
   //         review "verified" sources (e.g., agreed with Insurance company //
                       (source of information reliable)
   //
   If Talent received serious injury led to permanent disability
   Pay.DisabilityClaim;
           // owner.capture { }          //capture current owners of stock
                                         // distributed ledger
           // autopay.currown            // optional function to capture and
                                         // distribute payment to all current stock
                                         // holders
        Else repeat checking data process;
        }
Contract TermsAndConditions {
DateLastUpdated;
["Written terms and condition"]
     }
}
Add Signature {
   Signature sig = signature.getsign;
   Unique Signature for each stock
   };
   return Signature;
== End Insurance Smart Contract ==
```

Example Investment Portfolio Pseudocode:

```
== Start Investment Portfolio Smart Contract ==
Certificate Details {
  Title digital stock Certificate;
  CompanyName Lebron23;
  OwnerName Current Stock Owner;
}
InvestmentPortfolio Contract {
   Function InvestmentReturn ( ) {
   Get.ROI;
   through Oracles connected with Investment Manager
   Net of Management's fees
   send.ROI(InvestmentBalance);
   }
```

```
Function InvestmentDividends ( ) {
If Dividend of investment paid out {
Prompt Talent to select payout or reinvest;
   If payout {
       Send.dividendPayout(InvestmentBalance);
       }
   if reinvestment {
       send.DividendReinvestment(InvestmentBalance);
       }
   else if {
   send.Dividend(InvestmentBalance);
   default option to reinvest if no response
   }
```

```
Function InvestmentRedemption ( ) {
If Talent request to redeem;
   redemptions {
      Verify from Investment Manager of funds' availability
      Send.redemptions(InvestmentBalance);
   }
}
Function InvestmentBalance ( ) {
CurrBalance + ROI – dividends - redemptions = new.Invbalance;
```

```
Contract TermsAndConditions {
   DateLastUpdated;
   ["Written terms and condition"]
}
}
Add Signature {
   Signature sig = signature.getsign;
   Unique Signtaure for each stock
   };
   return Signature;
== End Investment Portfolio Smart Contract ==
```

Example Intellectual Properties Contracts Pseudocode:

```
== Start Intellectual Properties Smart Contract ==
Certificate Details {
   Title digital stock Certificate;
   CompanyName Lebron23;
   OwnerName Current Stock Owner;
}
Intellectual Properties Details {
   Function IPtypes( ) {
   Brand = "DescriptionAndDetails";
   Licensing = "DescriptionAndDetails";
   Projects = "DescriptionAndDetails";
   Inventions = "DescriptionAndDetails";
   Others = "DescriptionAndDetails";
   Combine IPs = all.IPs
   }
   Function CalcIntellect {
   // Talent agrees to assign part of the rights of the above IPs based on an agreed
   // percentage and contribute to the entity any income related to the IPs based on the
   // following calculation
   IPs.Contribution = IncomeFromIPs * IncomeSharePercentage;
   }
}
Add Signature {
   Signature sig = signature.getsign;
   //Unique Signtaure for each stock//
   };
   return Signature;
== End Intellectual Properties Smart Contract ==
```

Existing Contracts Pseudocode:

```
// Description: The final tab will allow the Talent to add existing contracts by attaching
// documents and host them in a distributed system. The host will issue a
// cryptographic hash for the file that can be added into the digital stock. The additional
// contracts can be related to intellectual property or insurance coverage. Depending on the
// requirement, a node can be established to update any smart contract affected by the
// additional contracts (for example, re-encode information into digital objects).
== Start Insurance Smart Contract ==
Certificate Details {
   Title digital stock Certificate;
   CompanyName Lebron23;
   OwnerName Current Stock Owner;
}
Additional Contracts {
   #Contract1;
   #Contract2;
   #Contract 3;
//Combine contracts and host on them in IPINS or similar hosting servers with cryptographic
//hash
}
function ContractAnalysis( ) {
//Analyze the contracts and identify if any contract are related to previous smart contracts
   If yes
      Prompt Talent to agree on adding changes to related smart contracts
   If no
      Keep as it is
}
```

```
Add Signature {
  Signature sig = signature.getsign
  //Unique Signature for each stock
};
  return Signature
== End Insurance Smart Contract ==
```

Figure 4:
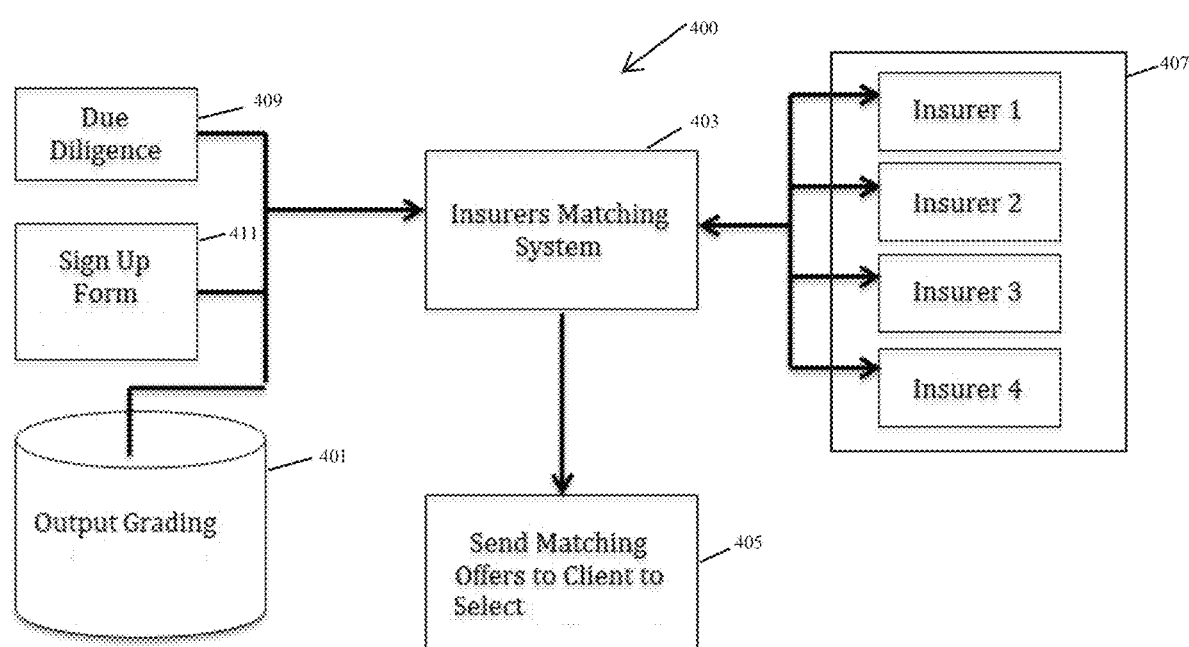
FIG. 4 is a block diagram of an insurance selection system, according to one embodiment.

FIG. 4 illustrates an insurance selection subsystem 400. In some embodiments, the insurance subsystem is configured to automatically select a new insurance policy to recommend to new Talent, which may occur, for example, as part of the new Talent registration process shown in FIG. 1. In one embodiment, the system may use output grades to determine a set of insurance policies for the new Talent. In some embodiments, the output grades 401 are generated by a data analytics system such as the one shown in FIG. 2. The output grades 401 may, for example, comprise a risk level of the new Talent generated by a data analytics system such as one illustrated in FIG. 2.

A data analytics system, such as the one illustrated in FIG. 2, can use the latest available information regarding a new Talent to maintain a constantly evolving data model of the Talent's value and risk. The data may be stored in an output grading database, e.g. 401. The data can, for example, comprise specific parameters that indicate a current risk level of the new Talent based on the latest available information. In one example, a machine learning algorithm is generated to associate captured data with risks level based on fitting to existing data models. In one example, the machine learning approach includes definition and analysis of more than 5 machine learning independent variables. In some implementations, a smaller number of independent variables model is use to test risk level and determine if more detailed analysis (e.g., greater precision algorithm is required). This can reduce the computational burden of implementing various machine learning approaches.

According to one embodiment, the insurance selection system 400 may contain an insurance matching subcomponent 403 configured to use output grading data 401 to select insurance policies and providers from a network of a plurality of insurers 407. The insurance selection subsystem 400 can then output one or more matching insurance options for the new Talent 405. In one example, the output grading 401 may comprise a risk level between one and ten generated by the data analytics system 200. The insurance matching subcomponent 403 can be configured to select insurance policies to present to the new Talent based on the risk level. If, for example, the new Talent has a risk above an upper risk threshold (e.g., a level 8 on a scale of 1 to 10), which can represent a very high risk level, the insurance matching subcomponent 403 may select only insurance plans with a capability to handle a disability coverage of above a certain amount of coverage. Conversely, if the new Talent has a risk below a lower risk threshold (e.g., a score of 3 on a scale of 1 to 10), which can represent a low risk level, the insurance matching subcomponent 403 may select insurance plans that have a lower amount of coverage.

In some embodiments, the insurance matching subcomponent 403 is configured to use information from the output grading database 201 to present one or more insurance policies to present to the new Talent. In one example, the insurance matching subcomponent maintains APIs to databases of one or more insurance providers 407. The system may query the databases to request and retrieve latest available information about coverage policies offered by a network of insurance providers 407. The system can then retrieve insurance plans to present to a Talent as described above.

Upon selecting one or more insurance policies that provide the necessary coverages for a new Talent, the system may output the offers to the new Talent to select 405. In one embodiment, the system may generate a results webpage or screen of a mobile application that displays a list of the selected insurance policies such as one displayed in FIG. 11. The system may further generate information that is to be displayed to the new Talent relevant to the new Talent's selection of a plan. The information may include monthly premium costs for the plan, coverages, and payout information. The system may also generate a user interface in which a user can choose to view more detailed information about a policy from a list of policies. Upon receiving a request for more information, the system can generate a new page that provides information regarding a specific plan or policy. Further, the system can generate a user interface that allows the user to select and sign up for a specific insurance plan. One example interface is shown in FIG. 20.

Upon the insurance selection subsystem receiving a selected insurance plan from the new Talent, the plan information can be utilized in a process of initializing the new Talent into the talent exchange system, e.g. process 100. In some embodiments, the selected plan information can be utilized as part of calculating an initial valuation for the new Talent 125. The payout and premiums associated with the plan, for example, can be factored into the initial valuation of the new Talent.

Figure 5:
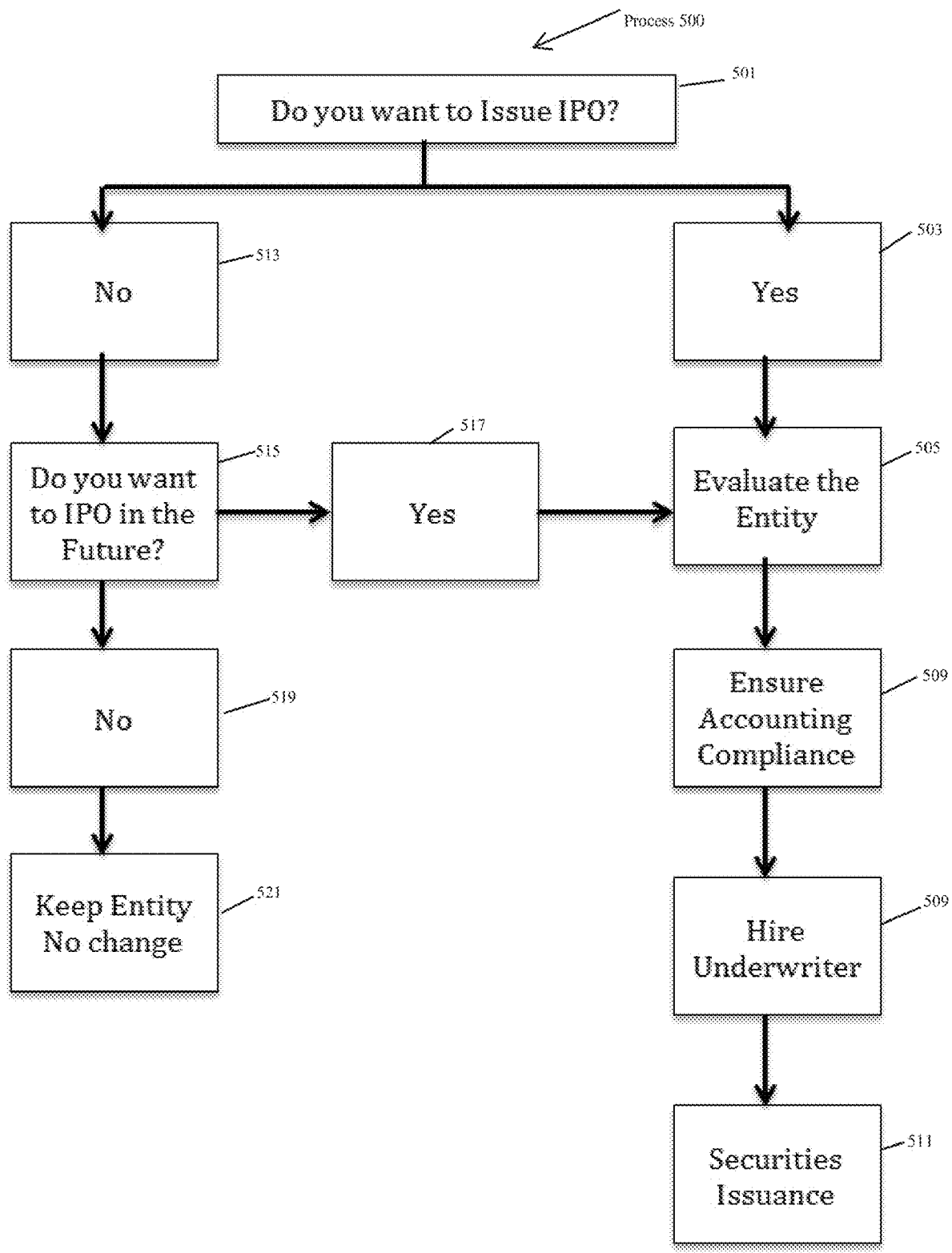
FIG. 5 is an example process flow for an initial public offering, according to one embodiment.

FIG. 5 is one embodiment of a process flow 500 to make an Initial Public Offering IPO for an entity representing a new Talent and the new Talent's insurance policy. The process flow 500 begins by asking the new Talent whether he or she wants to issue an IPO 501. In one embodiment, the system may generate a webpage on an Internet website or an interface of a mobile application asking whether the new Talent would like to initiate an IPO. The webpage or interface of the mobile application may present the user with a 'Yes' option 503 and a 'No' option 513. If the system receives a 'No' response from the user 513, the system generates a question on a webpage or screen of a mobile application asking the new Talent if he or she wants to issue an IPO in the future 515. The system may again generate a 'Yes' and 'No' option for the user to select from on a webpage or screen of a mobile application. If the system receives an input indicating 'No' 519, the process ends and the entity can remain unchanged.

If the system receives an input from the user indicating that the new Talent wants to issue an IPO now 503 or in the future 517, the system may proceed to evaluate an entity representative of the new Talent 505. In some embodiments, the entity can comprise accounts to which the new Talent pays premiums of an insurance policy. The insurance policy can comprise one or more of life insurance, disability insurance, loss value insurance, and other insurance products. The entity may have privileges similar to those of a company.

To evaluate the entity 505, the system can, for example, determine whether the entity meets all regulations required to legally make an IPO. In one embodiment, the system retrieves insurance policy information of the new Talent. The system may further require the new Talent to enter further account information about the entity. In one example, the system presents the new Talent with a form on a webpage or a mobile application in which the new Talent must input relevant account information. The system can then automatically analyze this information and the new Talent's insurance policy information to evaluate the entity 505. Furthermore, the system may utilize calculated outputs of a data analytics system, e.g. system 200, to evaluate the entity. The outputs of the data analytics system such as expected future earnings, risk, and other parameters discussed above with respect to the data analytics system may be utilized to value the entity created by the new Talent. Upon evaluating the entity, it may be determined whether the new entity meets accounting regulations 507.

In some embodiments, upon determining that the entity representing the new Talent and his or her insurance policy meets requirements for issuance of an IPO 505, 507, the system can proceed to initiate the underwriting process 509. The system can, for example, communicate to a financial institution to initiate the underwriting process. Further, the system may transmit all relevant account, new Talent, and insurance information to the financial institution. The financial institution may then issue securities to investors 511. In some embodiments, the system may present securities to investors on an Internet webpage or screen of a mobile application. The system can, for example, generate a display showing valuation of the security, long term growth outlook, and information about the new Talent. The system may provide potential investors with an option to purchase securities. In some embodiments, the system may limit investors to only registered individuals or brokers for a certain period of time. The system can, for example, limit access of an investment option of a webpage or mobile application to certain users for a set period of time after issuance of securities. The system may maintain a database of investor usernames and associated permissions for each. The system can restrict access to an investment option in a webpage or screen of a mobile application for various users based on these permissions.

Figure 6:
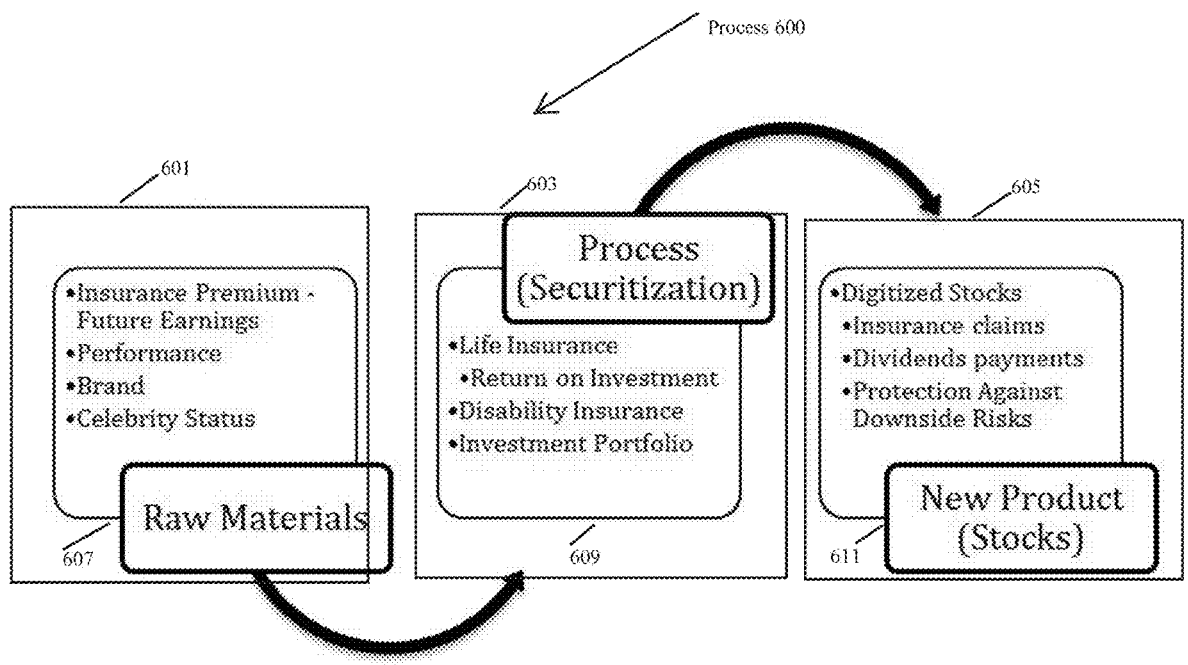
FIG. 6 is an example process for converting Talent and analysis information into a digital object, according to one embodiment.

FIG. 6 illustrates one embodiment of a process 600 by which the talent exchange system converts a new Talent into a digital stock 611. The system takes in as input 601 raw materials 607. The raw materials can comprise the new Talent's income share agreement, the new Talent's insurance contract, and the new Talent's investment portfolio contract. Furthermore, the raw materials may also comprise other contracts from which the new Talent gains revenue. These other contracts can include licensing contracts, sponsorships, product endorsement deals, intellectual property owned by the new Talent, and any other intellectual property specific to the new Talent's area of expertise. In some embodiments, the raw materials can further include data collected about the new Talent indicating the new Talent's performance, celebrity status, brand, health, and other factors that influence the net value of the new Talent entity.

The system can take in the raw materials and can use a data analytics system, such as system 200 illustrated in FIG. 2, to automatically calculate a risk level for the new Talent. The data analytics system can be configured to collect and analyze data in real time to update a constantly evolving data model of the new Talent's value, risk, and other properties. Further, the talent exchange system can utilize the outputs of the data analytics system to securitize the new Talent 603. In some embodiments, securitization can include utilizing processed raw materials to generate insurance policies to cover risks associated with the new Talent. The insurance policies may comprise one or more of life insurance, disability insurance, loss value insurance, and other insurance products. The system can automatically select one or more insurance policies to choose from or provide an insurance coverage change agreement to modify an existing insurance policy to meet coverage requirements as described with respect to process 100. The system can use a subsystem such as system 400 to select an insurance provider and policy for the new Talent. The system may automatically select an investment portfolio or automatically generate a list of options from which the user can select an asset class and manager.

In some embodiments, the system constantly updates the insurance policies based on the updating data model of the new Talent. The system can, for example, modify the premium based on a changing risk model of the new Talent. The Talent can pay premiums into separate accounts that are established as an entity with company privileges. The system may present the user with an option to initiate an IPO and issue stocks for the entity using a process 500. The system can, for example, provide a user of a webpage or a mobile application with a form or interface from which the user can initiate an IPO process. The system then automatically communicates necessary information to relevant financial institutions to initiate a value of the new Talent's entity and securitize it. The system may execute process 500 to do the IPO and create digital stocks 605. The digital stocks then can be distributed to investors for investing. In some embodiments, the Talent Exchange system generates an Internet website and/or mobile application in which investors can purchase stocks for the new entity. Upon securitization of the new entity, the system may add the new stocks into a listing of available stocks for investors to purchase using the Internet website or mobile application.

One embodiment of a digital stock is illustrated in FIG. 17. The digital stock can include a digital stock certificate 1710. A digital stock certificate can comprise a legal certificate of stock ownership in the form of software code. The digital stock certificate may further comprise a company name that it represents a share of. It is appreciated that the SEC does not require physical certificates of stock ownership. All stock ownership records may be maintained by the system in a database and easily accessible to the SEC or any other regulatory body. The digital stock may also include a company name for the Talent and a current owner of the stock 1710.

In some embodiments, the system may further store a plurality of contracts as part of the digital stock. The plurality of contracts can include income share agreements 1720, insurance contracts 1730, investment portfolio 1740, intellectual property agreements 1750, and other existing contracts 1760. In some example embodiments, the system stores the contracts as smart contracts. Smart contracts can be stored in the form of software code in a digital stock. In one example, a smart contract can comprise a function that calculates revenue generated from a particular contract. The smart contract may store several parameters from which a total revenue may be calculated. In the specific case of an income share agreement 1720, for example, the smart contract may include software code that is configured to calculate total income from the Talent's salary, endorsements, and licensing contracts and a share of the total income that is paid to an entity whose share is represented by the digital stock. In some embodiments, the digital stock may further comprise software code encoding selected insurance plans and investments of the Talent is discussed above.

In other embodiments, the digital stock may further include smart contracts for intellectual property of the Talent. For intellectual property smart contracts 1750, the system may include software code that is configured to calculate revenue generated from the Talent's current brand, licensing, trademark, invention, and other projects. The software code may be configured to monitor parameters relevant to each smart contract in real time to update the digital stock with current data. For intellectual property smart contracts, the software code may be configured to collect information on revenue generated from all intellectual property of the Talent. The software code may be further configured to calculate a total intellectual property revenue and a portion of which the Talent has agreed to pay to an entity whose share is represented by the digital stock.

In some embodiments, the Talent Exchange system provides a user interface to add smart contracts to a digital stock as part of the stock creation process 600. FIG. 21 illustrates an example embodiment of a digital stock 2100 before smart contracts have been added. For a given contract, the system may generate a form on a webpage or a screen of a mobile application. The form provides a user with information and obligations of the contracts, an input field for a user to sign the contract, and an option to either accept or reject the contract. For example, in order to add an income share agreement smart contract to a digital stock, the system may generate an income share agreement webpage or mobile application screen as illustrated in FIG. 13. The system may display payment obligations, terms, conditions, disputes, arbitration agreements, payment methods, and other contract information to the user. The user may have an input field in which to enter an e-signature to approve the contract. The system may further generate an option to confirm the contract terms or reject them. Upon receiving a confirmation, the system may validate an entered e-signature. The system may, for example, check that the e-signature matches a valid signature for the user in a database. If the e-signature is valid, the system can, for example, generate the smart contract software code and add it to the digital stock as shown in FIG. 14. The system may also encode the e-signature as part of the smart contract in the digital stock to maintain proof of confirmation. The e-signature can, for example, provide digital commitment using encrypted based coding. If the system determines that the e-signature is invalid or receives input from the user that the contract has been rejected, the smart contract is not added to the digital stock.

Figure 15:
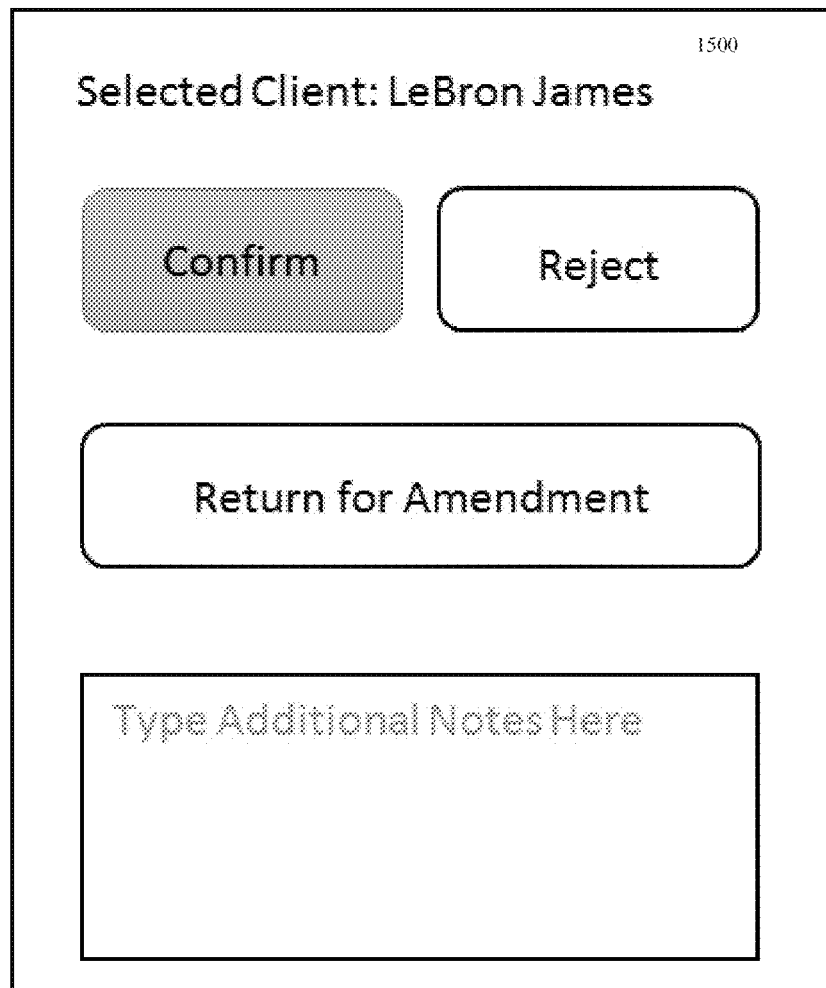
FIG. 15 is an example insurance provider contract confirmation screen, according to one embodiment.
Figure 16:
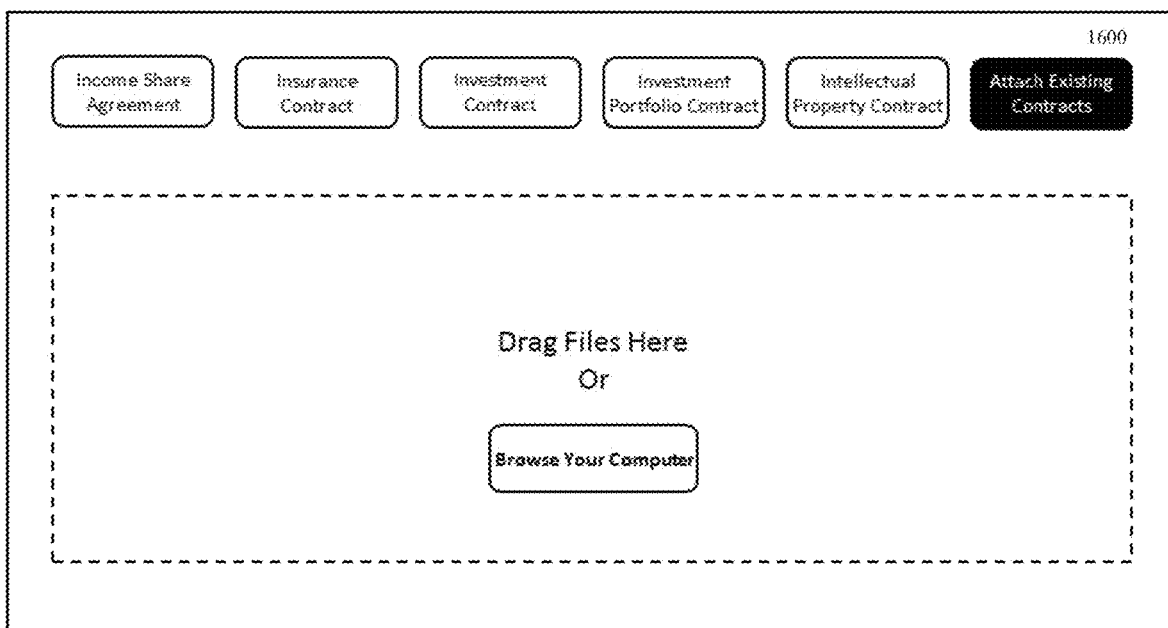
FIG. 16 is an example menu for adding existing contracts to a digital object, according to one embodiment.

For insurance contracts, upon receiving confirmation from a user the system may further notify an insurance provider of the contract details. The system may, for example, generate a notification and transmit it to the insurance provider in response to receiving a contract confirmation and validating the e-signature. The system may provide the insurance provider with a webpage or mobile application screen in which the insurance provider may confirm the contract, reject the contract, and or return the contract for adjustments as illustrated in FIG. 15. The system may also provide a field in which extra notes can be added as shown in FIG. 15. In some embodiments, the system may further incorporate contracts that already existed into the digital stock. The system may, for example, provide an interface on a webpage or mobile application menu in which a user may add existing contracts as illustrated in FIG. 16. The system may generate an input that allows a user to drag and drop a contract file or that allows the user to browse a computer or mobile device for a contract file. The system may receive the file and store it as part of the digital stock. The system may, for example, generate a cryptographic hash for the file and add it to the digital stock.

Smart contracts can further allow for multi sig operation. The system can, for example, allow a transaction of stocks to take place with agreement from two or more parties using multi sig. Furthermore, by using smart contracts the system may lock funds associated with transactions with a mediator. In some embodiments, the system can utilize real world information to process transactions with smart contracts.

In some embodiments, the digital stocks 605 produced by the system can also include a record of ownership of the stock and a record of stock value. When a stock transaction takes place, the system may update the record of ownership of the stock. The system can, for example, update a database to store this information. The system may also store a historical record of valuations for the stock, a record of number of stocks issued, and a listing of all smart contracts included with the stock. In some embodiments, a digital stock may also include timestamps of transactions and/or ownership changes associated with the digital stock.

The digital stocks 611 may have one or more rules that govern the stocks. In some embodiments, the Talent can issue a change in the insurance policy. The system may provide a user with a webpage or menu in a mobile application to make insurance policy changes. One example webpage or mobile application screen is illustrated in FIG. 22. The system can then receive those modifications and automatically communicate them for approval from the insurance provider. In one example, the system utilizes an API to communicate the information to the insurance provider. Upon receiving approval form the insurance provider, the system can recalculate the stock value. Furthermore, the system may restrict issuance of new stocks to only an originator. The originator of a digital stock can include the Talent or a legal representative of the Talent. The legal representative of the Talent may include a financial advisor, agent, lawyer, parent, or other representative. The system may, for example, provide the originator a special option on a webpage or mobile application to originate new stocks. Any change requests from the webpage or mobile application can be validated using and e-signature of the originator. The system may receive an e-signature of the Talent and validate it using cryptography. The e-signature may be cryptographically encoded with the change in the digital stock.

Figure 23:
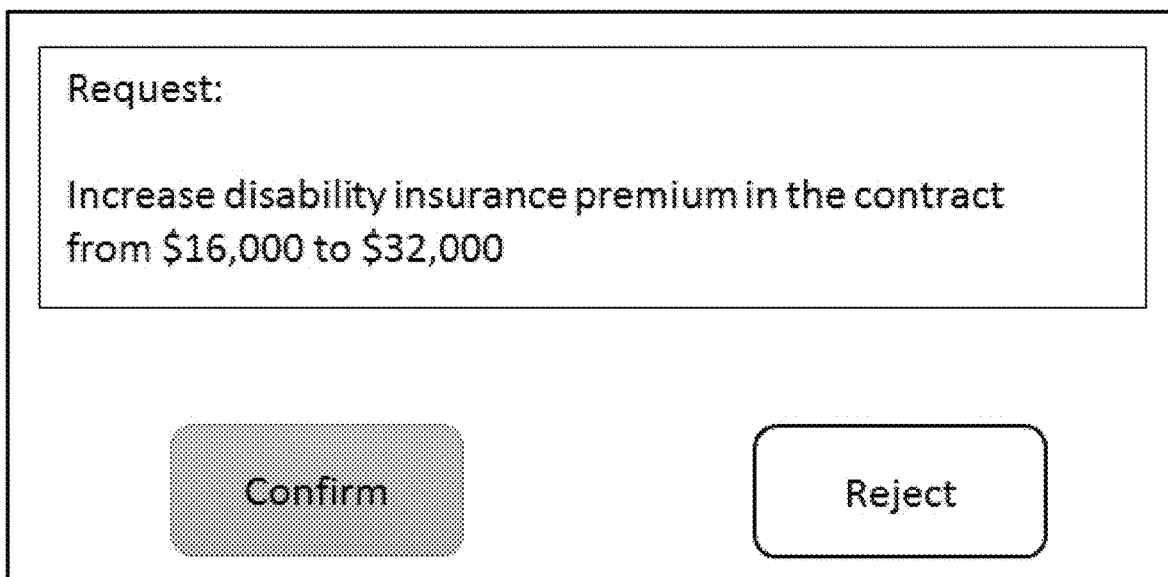
FIG. 23 is an example screen capture of a change request menu, according to one embodiment.

In some embodiments, a custodian may also request changes to a digital stock. A custodian can include an insurance provider, an asset manager, or other entity involved with the digital stock. The Talent Exchange system may present the custodian with a platform on a webpage or mobile application from which to request changes. One example webpage or mobile application screen is shown in FIG. 23. The talent exchange system may then receive change requests from this platform. The system may then transmit the request details to an originator of the digital stock. The originator may then use an e-signature as described above to confirm changes. In one example, an insurance provider may submit a request to change disability insurance coverage for the Talent. The talent exchange system may receive the request which may include updated variables for the insurance contract such as premiums, collection details, and other contract parameters. The talent exchange system may then transmit these details to the originator. The system may generate a webpage or screen of a mobile application that displays the change information to the digital stock originator. The originator may then sign with an e-signature to approve the changes or reject the changes. If the originator accepts the changes, the system may update the digital stock with the changes. The system may, for example, update variables and functions of software code for a smart contract associated with the changes. The system may further encode the e-signatures of the Talent and the originator with the change in the digital stock.

Upon receiving a request to issue new stocks, the system can automatically update the number of stocks available for the entity and recalculate the stock value. The system may also allow investment managers and insurers to have control of the stock. The system may provide the new Talent and the investment managers and/or insurers various option on a webpage or mobile application describing the rights and involvement of each party. The system may provide the investment managers and insurers with permissions to manage assets allocated to them, confirm changes to a smart contract, and validate changes in the digital stock.

Figure 18:
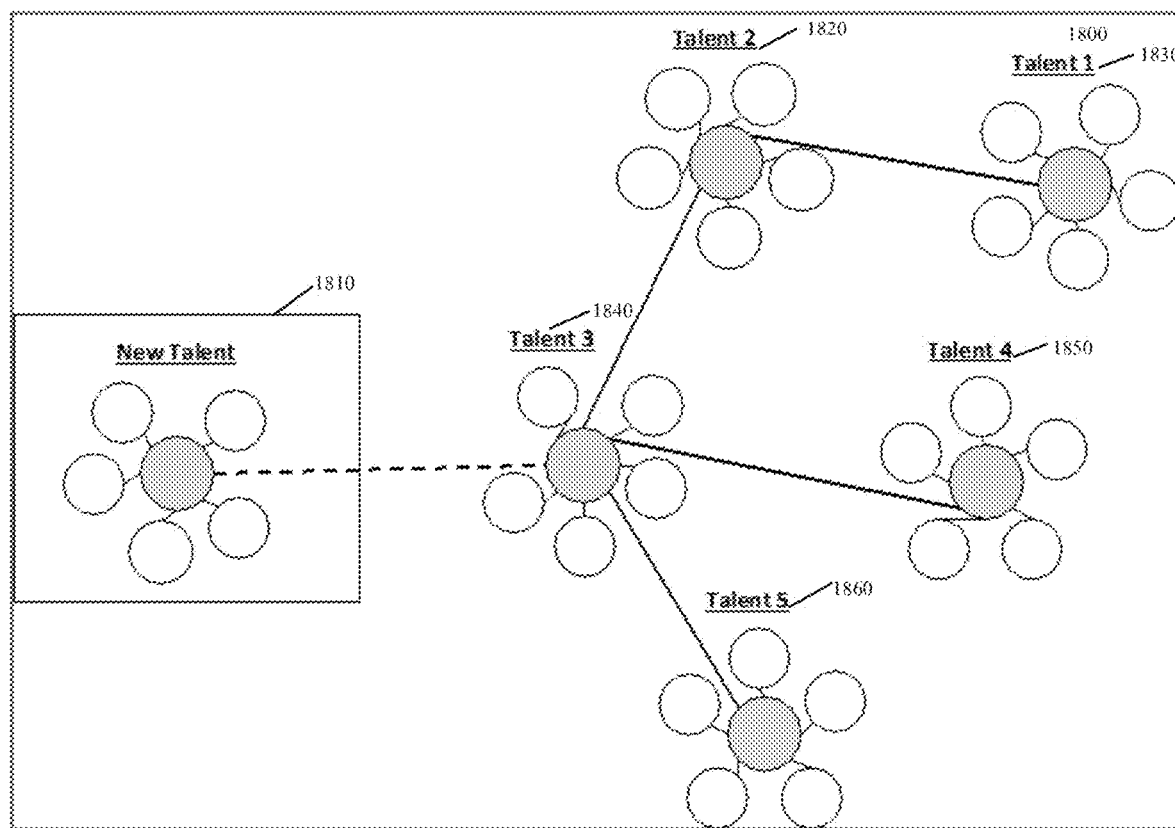
FIG. 18 is a network diagram of an example network of digital stocks, according to one embodiment.

In some embodiments, the talent exchange system maintains a network of current digital stocks. One example embodiment of a stock network is illustrated in FIG. 18. When a new digital stock 1810 is created, the talent exchange system may add the new digital stock to the current network of digital stocks 1800. The network of stocks 1800 may comprise a linking of one or more digital stocks 1820, 1830, 1840, 1850, 1860. In one example, the network of stocks 1800 comprises a distributed ledger. The distributed ledger includes all digital stocks in the talent exchange system and all transaction records associated with the digital stocks. Further, the distributed ledger may be distributed to a plurality of users of the talent exchange system. The talent exchange system may, for example, add a new digital stock based on consensus of member computers in the network. In a specific embodiment, the system may use Byzantine Fault Tolerant to determine consensus among the member computers.

In one example embodiment, all records associated with a stock are stored in a distributed ledger. In the distributed ledger, the talent exchange system may distribute any changes in the stock to all members of the network. By doing so, the system maintains all records within one ledger. The talent exchange system may update the distributed ledger automatically upon execution of a digital stock transaction. The talent exchange system may, for example, maintain records as a linked chain of blocks. In response to execution of a transaction, the talent exchange system may automatically add a block encoding a record of the transaction. The record may include exchanged assets encrypted digital signatures of parties involved in the transaction. A regulator or other party may then only need to check one database to validate transactions and access stock records. Further, the system may also maintain a transaction record of the stock that is immutable, and may also rely on the implementation of the distributed ledger which is replicated across so many users that it is nearly impossible to modify without system approval. It is appreciated that this allows for simple auditing and tracing of stock records. The system can, for example, provide a special webpage and mobile application menu for regulators. The regulators may access all records associated with stocks on the webpage or in the mobile application. The system may receive a request for records associated with a particular stock. Upon receiving the request, the system can query a database to obtain all records associated with the stock. The system can then generate a webpage or a mobile application screen displaying the full stock record.

Figure 19:
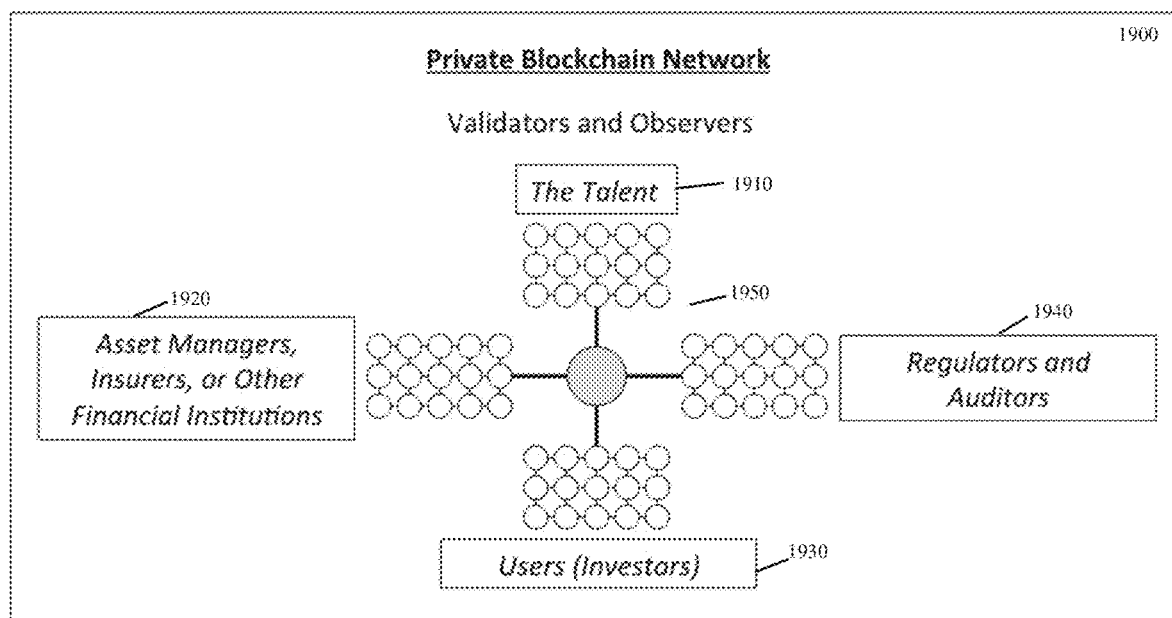
FIG. 19 is a block diagram of an example network associated with a digital object, according to one embodiment.

FIG. 19 illustrates an example embodiment of an individual digital stock network 1900 for each stock in the network of stocks 1800. By using a distributed ledger, multiple parties may have access to view the digital stock. The parties may include the Talent 1910, financial institutions 1920, regulators or auditors 1940, and investors 1930. Regulators and auditors 1940 may include entities such as the Securities and Exchange Commission SEC. The talent exchange system may maintain specific permissions for each party who has access to the system. The SEC, for example, may view a record of all the stock's transactions and owners of the stock. The system may limit investor 1930 access to data to only view their own assets, balances, and transactions. The Talent 1910 and the financial institutions 1920 may have permissions to modify portions of the digital stock.

Figure 7:
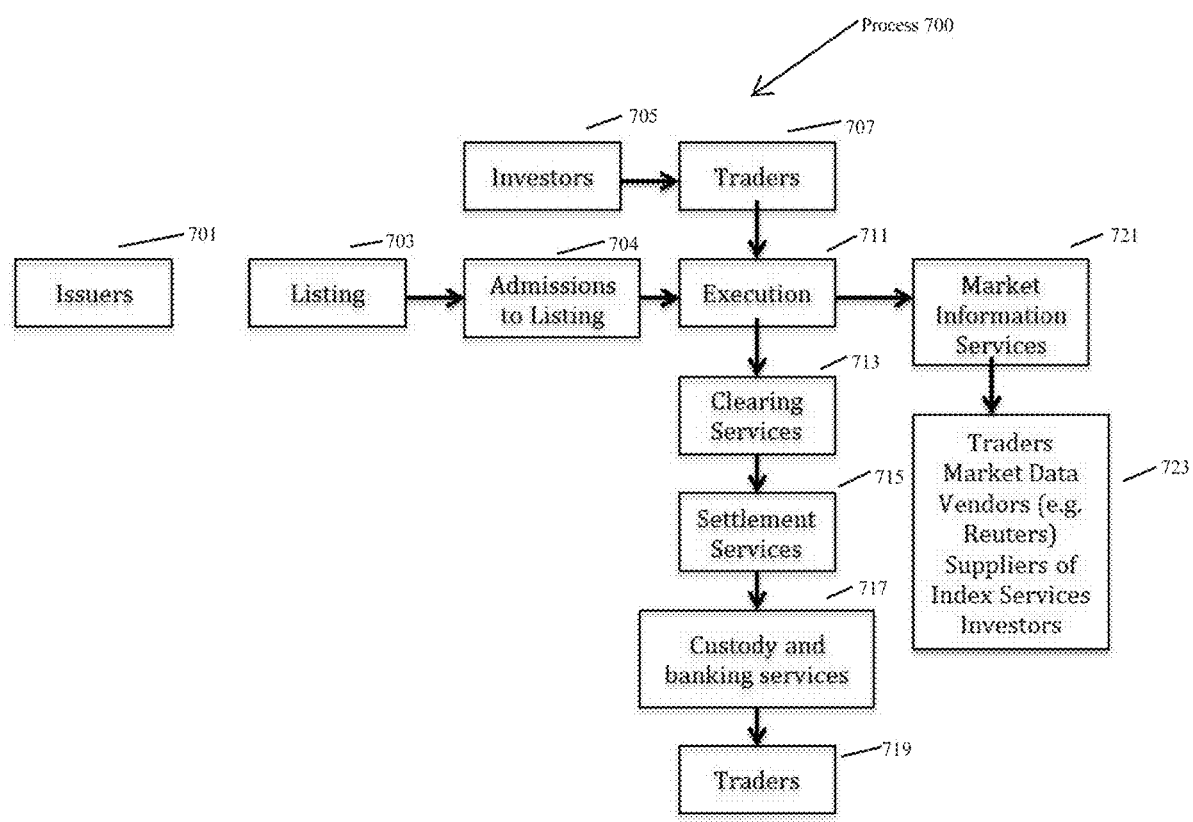
FIG. 7 is an example process flow diagram of a conventional stock exchange system.

FIG. 7 illustrates a conventional stock exchange process flow 700. The conventional stock exchange system comprises several different services and parties. The system may include issuers 701 that issue new stocks for an entity. The new stocks are entered into a listing 703 which may comprise a listing of stocks. The stock also requires admission into listing 709 to allow the stock to be listed in official stock listings. Investors 705 may work with traders 707 to conduct stock transactions. The traders execute the transactions 711 which are cleared by clearing services 713 and settled 715. A custody and bank then complete the transaction 717 for the trader 719. The transaction is also communicated to market information services 721 for displaying to traders, market data vendors, suppliers of index services, and investors 723. In some embodiments, a conventional platform can be augmented to utilize the novel digital objects discussed herein.

Figure 8:
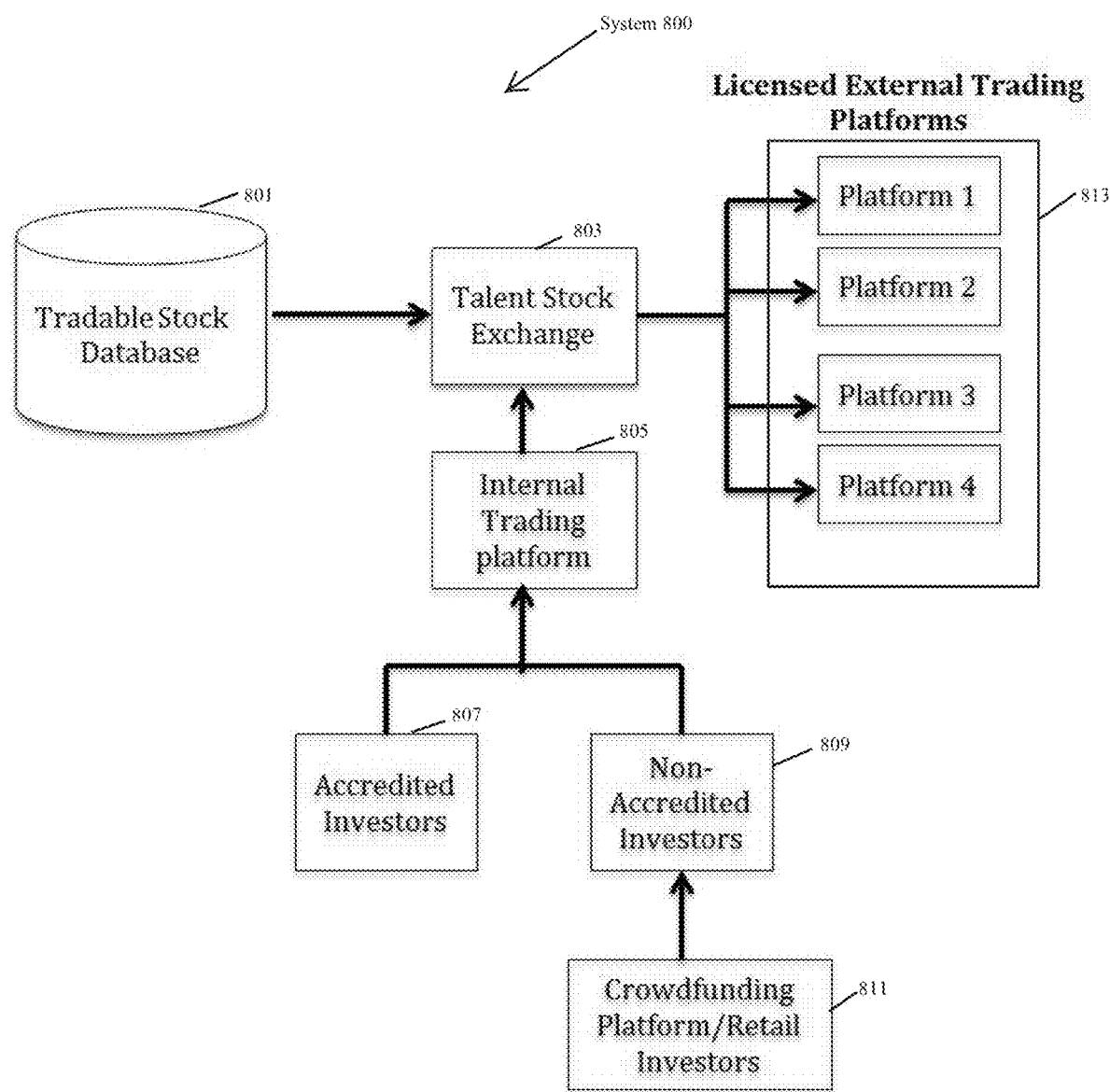
FIG. 8 is an example block diagram of a stock talent exchange system, according to one embodiment.

FIG. 8 illustrates an example embodiment of a talent exchange system 800. The system 800 can include a database of tradable stocks 801. The system may maintain a database of digital tradable stocks in the database 801. In some embodiments, for each digital stock the system maintains a record of all the stock's transactions, owners, and values. The digital record maintained by the system eliminates the need for back office paperwork and retains a self-validating ownership record. The talent exchange component 803 is configured to access the database of tradable stocks 801. Accredited investors 807 and non-accredited investors 809 may work with traders 805 to access the talent exchange 803 to conduct transactions. The talent exchange component 803 may also interface with one or more licensed trading platforms 813 to allow individuals to conduct stock transactions.

The talent exchange component 803 may provide traders 805 with an investment interface to execute transactions. The talent exchange component 803 may provide a listing of all available stocks and up to date stock records to traders 805 on an execution platform of a webpage or a mobile application. Accredited investors 807 and non-accredited investors 809 can communicate with traders to execute transactions. In one embodiment, the talent exchange system generates a webpage or mobile application screen from which a trader can execute stock transactions. The talent exchange component 803 can receive a transaction request from a trader 805 accessing the system through a website or mobile application. Upon receiving a transaction request, the system may automatically validate the transaction. The system may further encrypt and store a record of the transaction in a distributed ledger and update it for all users in the system. The system may further query the stock database 801 to update records of stocks relevant to the transaction. In one example, upon execution of a transaction by a trader 805, the system updates the stock record with new owners, new values, and other transaction details in the database 801.

In one embodiment, the talent exchange 803 includes a distributed ledger. The talent exchange component 803 may be configured to utilize the distributed ledger to distribute all transaction details to a talent exchange network 803. By distributing all transaction details, the system makes all records transparent and removes a need of a trusted intermediary to oversee transactions. The talent exchange component 803 can, for example, maintain a distributed ledger that includes balances of users of the system, historical transactions, and history of stock values. Furthermore, the stock exchange component 803 may encrypt any data prior to storing it in the distributed ledger. The stock exchange component 803 can also restrict access to views of assets and balances to users. The stock exchange component 803 may, for example, allow users to only view their own assets, balances, and transactions by removing permissions to access data related to other users' assets, balances, and transactions. The stock exchange component 803 may grant access to any data to an entity for regulatory or auditing purposes. The stock exchange system 800 may include a system administrator that has access to all data in the system. The system administrator may access data for a regulatory entity. The system administrator may also access data to perform anti money laundering AML checks. The stock exchange component 803 may, for example, use the system administrator to access data to perform automated AML checks.

Figure 9:
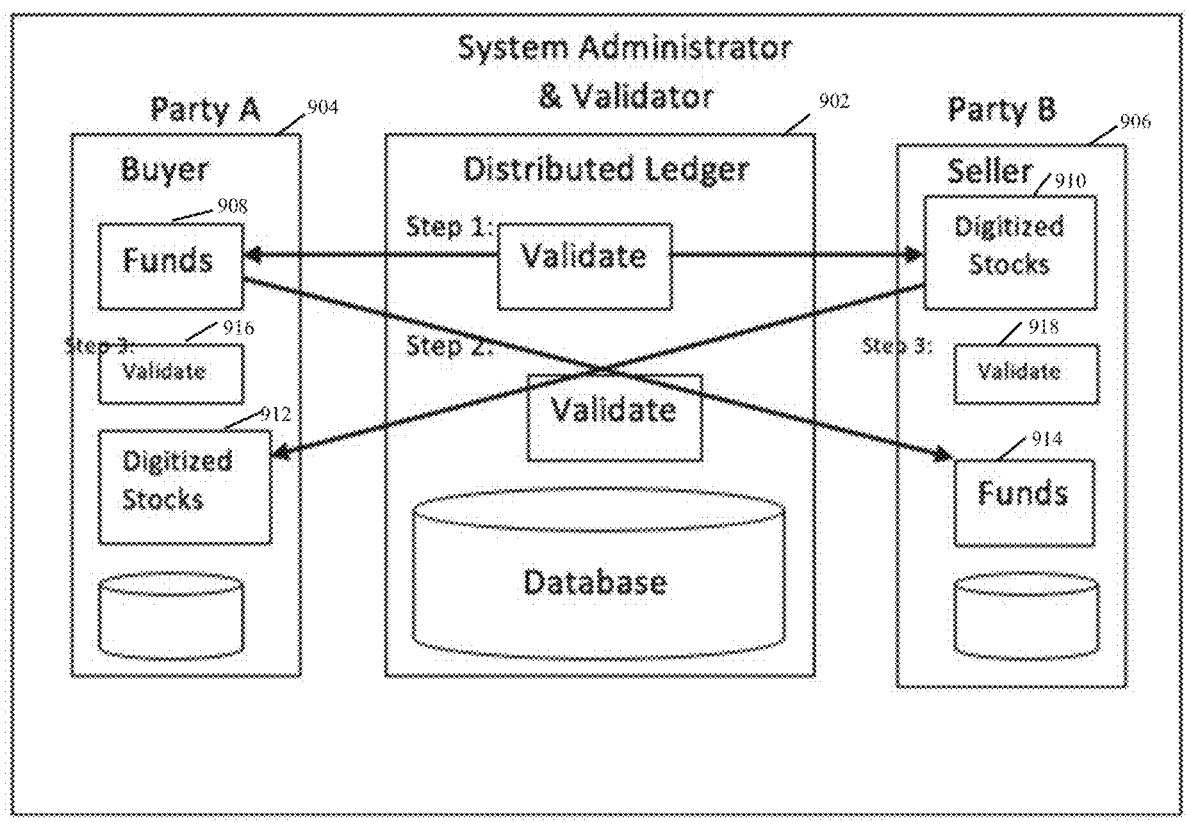
FIG. 9 is an example block diagram of a transaction validation system which may be used in some embodiments.

Upon execution of a transaction, the talent stock exchange 803 may automatically validate the transaction. An example embodiment of a validation subsystem is shown in FIG. 9. As discussed above, users may initiate the transaction through many trading platforms. The talent exchange system may also provide users with a website or mobile application from which users can execute stock transactions. In response to receiving a transaction, the talent stock exchange 803 may use the subsystem 900 to automatically validate the transaction. Upon execution of the transaction in which, for example, a buyer purchases a stock from a seller, the talent stock exchange system 803 may transfer a digital stock from the seller 906 to the buyer 904. The system 803 may, for example, modify an identity of an encoded current owner of the digital stock, which in this case is the seller 906, to an identity of the buyer 908. Further, the system 803 may transfer funds from an account of the buyer 908 to an account of the seller 914. The system may, for example, execute an electronic fund transfer between trading accounts of the buyer and seller. The validation subsystem 900 may also include a buyer validation component 916 and a seller validation subcomponent 918. The exchange system may request confirmation from the buyer and seller that transaction was requested. The exchange system can, for example, require an e-signature from both parties to confirm the transaction. The exchange system may encode the e-signatures cryptographically as part of the transaction record. The exchange system may further add the transaction record to the distributed ledger making it replicated to a plurality of users in the system. This maintains a verifiable record of the transaction.

The validation subsystem 900 may further include a system administrator component 902. The administrator component 902 may validate the transaction in real time in response to an agreement between two or more parties to execute the transaction. The system administrator component 902 can automatically check if the stock involved in the transaction is available with the seller 906. System administrator component 902 may, for example, check a seller account 910 to verify that the digital stock exists in the account. The system administrator component 902 may also automatically check if the buyer account 904 contains the required amount of funds to make the transaction. If the system administrator component 902 determines that the buyer 904 does not have the required funds or that the seller does not have the digital stock the system administrator component 902 may reject the transaction. In this case the system may block transaction execution from taking place and no updates to party accounts 904, 906 and digital stock transaction record may be made. In the case that each party has the required funds and/or digital stocks, the system administrator component 902 may allow the transaction to complete. In some embodiments, the system administrator component may further validate e-signatures of all parties involved in a transaction. The system administrator component may, for example, check encoded e-signatures for a transaction against a database of users to verify that the users are authorized to execute the transaction.

In some embodiments, the talent exchange system 800 may comprise a distributed system and architecture that includes several members. The system may comprise a network of several user computers. Each user can contribute computational power to the exchange system to expedite transaction execution. In one example, members of the network will automatically verify transactions. This may significantly reduce settlement times normally required for a stock transaction. The system may provide an interface to all members from which they can access stock records. The system may receive requests to view information for specific stocks. In response to receiving the request, the talent exchange component 803 may query the database 801 to identify and retrieve the appropriate stock record. The system then generates a display on a website or mobile application showing the full stock record to a member of the system.

In addition to providing an interface for traders, the talent exchange component 803 can be configured to further maintain an interface with one or more licensed trading platforms 813. The trading platforms 813 may include third party stock trading websites and mobile applications. The talent exchange 803 can, for example, maintain an API with each platform. The talent exchange component 803 may update the platforms with the latest available stocks and stock records. Further, a user of a platform may submit a transaction execution request on one of the platforms 813. Upon receiving the request the talent exchange 803 can update the corresponding stock records in the tradable stock database 801 and may further update the distributed ledger with the transaction. The system can also automatically distribute any funds associated with the transaction to appropriate accounts.

Upon execution of a transaction, the system may update a distributed ledger with the transaction details. In an example embodiment, the talent exchange component 803 may update the distributed ledger with the updated transaction. The stock exchange component 803 may, for example, update the distributed ledger in response to validation of a submitted transaction. The updated ledger can then be replicated to all users of the system. The system may, for example, store transaction data and other data as a wallet with linked blocks. Each block may contain a transaction or other record. The records may include encoded e-signatures of parties involved with the transaction. The stock exchange component 803 may encrypt data and add it to all users within the stock exchange system 800. For example, upon executing a transaction, the system may encode a record of the transaction as a block and then add it to the distributed ledger. The newly updated block may then be distributed to several users in the talent exchange system. The stock exchange component 803 may further add a link or an electronic time stamp and signature to all digital stocks. This may allow tracing of all real time transactions and historical transactions. Upon updating records in the database, the system may prevent any changes to the records to maintain an immutable transaction record. In further embodiments, the talent exchange 803 may also encode a complete record of ownership history of a digital stock in the digital stock itself. This can provide transparent record keeping, easy access to digital stock history, and increased security.

In some embodiments, the talent exchange system 800 may allow reversibility of transactions. The stock exchange component 803 may only allow reversal requests from authenticated users. Authenticated users may be users in a system with a permission to request transaction reversals. The stock exchange component 803 may require approval of the Talent, issuer, or other user before reversing a transaction. The stock exchange component 803 may, for example, generate a notification such as an email or mobile application notification to required approvers in response to receiving a transaction reversal request. The stock exchange component 803 may provide a user interface of a webpage or mobile application from which the approver can approve or deny the reversal. If the approver accepts the reversal, the transaction can be reversed. In this case the stock exchange component 803 may update the transaction record to undo the transaction. The system can, for example, update a distributed ledger and then replicate the updated ledger to a plurality of users of the talent exchange.

In one example embodiment of a stock exchange system 800, the system may require investors to register in order to trade in the system. The talent exchange component 803 may require all users to register. The talent exchange component 803 may, for example, generate an investor registration webpage or screen of a mobile application. The talent exchange component 803 then receives information submitted by an investor 807, 809. The talent exchange component 803 may then determine authorization of the user to execute transactions based on a set of criteria. The talent exchange component 803 may check whether investor information matches all criteria for authorization. The investor may be allowed to trade if all required criteria are met. Otherwise, the talent exchange component 803 may prevent the user from executing transactions. The talent exchange 800 may further utilize cryptographic codes to identify each user in the system 800. The stock exchange component 803 may further utilize a Know Your Customer KYC process to identify investors in the exchange system 800.

In some embodiments, the talent exchange system 800 may operate in multiple phases. In a first phase, the system may allow non-accredited investors that include one or more crowdfunding platforms. A trade 805 may work with the crowdfunding platform 811 to execute transactions through the talent exchange component 803. In a second phase, the talent exchange system 800 may allow non-accredited investors that include retail investors 811. In the second phase, the system can, for example, prevent further transaction executions by the crowdfunding platform. The talent exchange component 803 may be configured to accept transactions from non-accredited retail investors and reject transactions from crowdfunding platforms.

Figure 10:
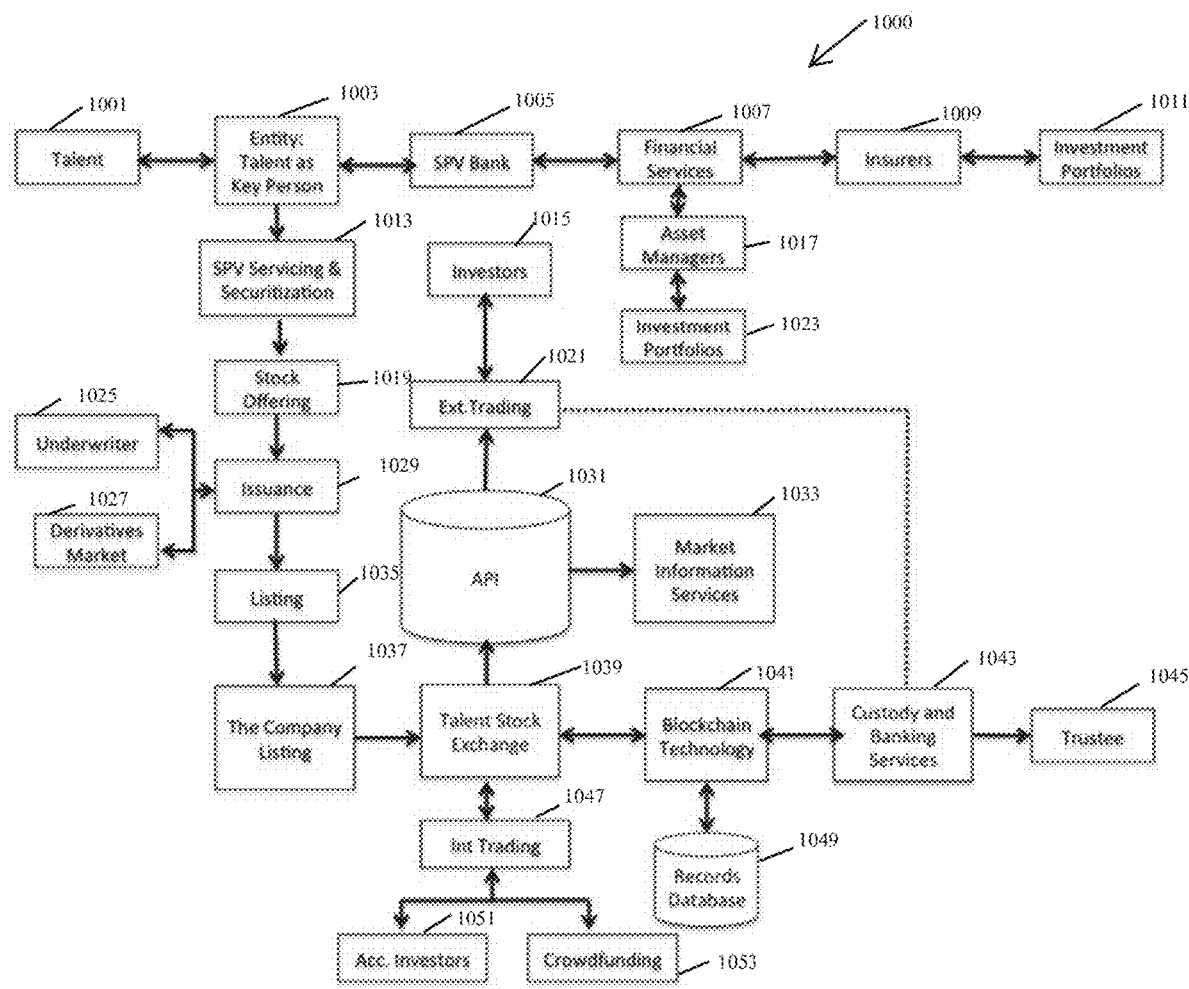
FIG. 10 is an example stock exchange data flow with system elements according to some embodiments.

FIG. 10 illustrates example data flow and system elements of a stock exchange 1000 that includes talent exchange embodiments 1039 described herein. The talent stock exchange can include one or more API's 1031 to interface with external trading platforms 1021 and market information services 1033. In some embodiments, the talent exchange 1039 can maintain the distributed ledger as a blocks 1041 storing a record of all transactions and digital stocks. The blocks can be updated in with each executed transaction and distributed to users which can include investors 1015.

Example Embodiment

One example embodiment relates to a system and processes that transform insurance policy and investments linked to expected future earnings of a Talented person into digital stocks stored in a wallet database in a distributed ledger. Talented persons can include professional athletes, actors, musicians, writers, scientists, entrepreneurs and others. The systems and the distributed ledger have a self-validation process that reduces frauds in transactions and allows regulators to monitor the data in near real time.

Similar to a traditional stock on the NYSE, an individual Talent will issue shares to the market through an IPO (Example: LeBron James 23, LLC). The player will then receive the money raised in the Initial Public Offering and will retain a majority equity stake in his/her company. The shares in the market will then be traded among fans and investors like an ordinary stock. As the player's brand value and expected earnings increase, the stock can benefit from demand and rise in price. Subsequently, the player could sell more shares at new market prices. The system is configured to require players to purchase insurance coverage in order to take their brand public.

Upon a Talent registering in the system, a new entity dedicated to the Talent can be formed. Next, underwriting operations can be executed. These operations will provide estimates of amounts of investment capital that could be raised for the Talent based on the Talent's historic performance, earnings, celebrity status, and other factors. An investment bank will handle the underwriting process. Investment banks today price underwriting fees and other fees, such as for legal and accounting, at 3-6% of the total amount raised. The offering costs will depend on the amount of capital being raised.

As soon as the Talent agree on the deal, the system is configured to compile all necessary registration documents for SEC filing. The Talent and/or his or her representatives will decide on an offering price based on an effective date that the SEC allows trading securities to start and on the level of interest from potential investors. The offering price will depend on an evolving data model of the Talent. Data can be collected from multiple resources and may include information such as performance statistics, historical earnings, news and media, medical records, and training attendance schedules from various sources. The system will utilize data crawling programs to analyze websites and pull related text, videos, and other information about the Talent.

The system may use machine learning techniques to analyze information about the Talent. The system may implement a convergence network to analyze videos and produce an output indicating that the information in the video indicates something negative, neutral, or positive about the Talent. The system may use sentiment analysis to analyze text and determine if it is negative, neutral, or positive. The system may further correlate performance statistic with earnings. The system may also match the Talent's performance statistics with other Talent's with relatable statistics to determine future earnings.

The system may use the analyzed data to determine a risk grade for the Talent. The risk grade may be based on the following criteria in descending order of importance:
1. The max/min future income expected
2. Expected career duration
3. Expected injury risk
4. Quality of lifestyle
5. Commitment to training and performance
6. Social media interaction
7. Scout ranking
8. Upside/downside potential income The system may determine a risk grade between 1 to 10 for the Talent, although other scales may be used. The risk grade may be used by the system to filter insurance policies that can be offered to the Talent as part of registering in the talent exchange system. Insurers with high coverages can be offered to Talents with high risk whereas insurers with low coverages can be offered to Talents with lower risk. Filtered insurance options can then be displayed to the Talent on a webpage or screen of a mobile application.

digital stocks may include the same information as any physical Stock Certificate in addition to other information related to the stocks in the form of software codes. The SEC does not require issuers to issue physical certificates, but does require maintaining records of the issuance. All issuance records and ownership registers may be maintained within multiple databases and can be accessible by the SEC or any other regulatory unit. A digital stock, unlike a conventional stock, will play an important role within the whole exchange. The digital stock can hold contracts that belong to the Talent encoded as smart contracts, records for historical transactions, and records of ownership. According to various embodiments, this makes the system transparent and enhances regulatory compliance.

To create a digital stock, the Talent must first register for certain contracts which can include an income share agreement, an insurance contract, and an investment portfolio contract. The Talent may further register for Talents related to intellectual property associated with the Talent such as product endorsements, brands, licensing contracts, sponsors, inventions, and other intellectual property. These contracts can then be encoded as smart contracts in the digital stock. The system may provide the Talent with a user interface of an Internet website or mobile application from which to enroll in the contracts. The system then encodes them as part of the digital stock. Smart contracts in the digital stock are encoded with parameters related to the contract agreement and functions to generate information regarding the contract agreement. For the income share agreement, for example, the digital stock may have a function that can use the Talent's current salary, endorsements, and licensing deals to calculate a total income. For an insurance agreement, the system maintains life insurance, investment, and disability insurance contract details as part of the smart contract encoded in the digital stock. Further, for intellectual property contracts, the system can encode, in the smart contract encoded in the digital stock, a function that calculates revenue from brands, licensing, projects, inventions, and other intellectual property. The system may encode parameters and functions in a similar fashion for other contracts.

The system can further encode the smart contracts with an e-signature that the Talent or representative of the client provides. The Talent can enroll in contracts and issue changes through an Internet webpage or mobile application using any compatible electronic device, such as computer or smartphone, then the system will validate the e-signature from the used device to the e-signature in the system using cryptography. The changes can be sent in a form of nodes into the system and the custodians (insurers and/or investment managers) can validate and confirm enrollments and changes before the changes are added to the digital stocks. Also, custodians such as insurers and/or investment managers can request changes that can be sent to the Talent for confirmation. The system can validate the e-signature of the custodian similar to the cryptographic methods used in validating the Talent's e-signature.

Smart contracts enable many features in the system. Smart contracts have been designed and are specially configured to automate transactions and allow parties to agree to the outcome of an event without the need for a central authority. Some features of smart contracts implemented is some embodiments, are programmability, multisig authentication escrow capability and ability to receive and process oracle inputs. A smart contract can automatically execute based on its programmed logic. Multisig allows two or more parties to the contract to approve the execution of a transaction independently which can be a requirement for multi-party contracts. Escrow capability ensures the locking of funds with a mediator (e.g. a bank or an online market) which can be unlocked under conditions acceptable to contracting parties. Sometimes, external inputs such as prices, performance, or other real-world data may be required to process a transaction. The system may use third party inputs (e.g., oracle inputs), captured and/or monitored data to help smart contracts incorporate this other data.

The system can also maintain certain rules for a digital stock. The system may limit permissions to initiate changes to the digital stock such that only the Talent or representative of the Talent can initiate any changes in the digital stock and further require any affected parties to approve and verify the changes. The system can allow investment managers and insurers to act as custodians of assets allocated to them. Custodians will validate contract agreements when the Talent enrolls in or changes contracts. For example, the Talent can issue changes in the insurance contract, but the insurance company must verify and approve the changes before reflecting the changes in the digital stock. The system may further allow the Talent to issue new stocks for the entity.

Once a digital stock has been created, the system can integrate it into a distributed ledger similar to the one illustrated in FIG. 18. The digital stock can then be exchanged in the talent exchange maintained by the system. In some embodiments, the digital stock can further hold a record of all ownership to provide greater transparency and security. The supply and demand in the talent exchange will determine the market stock price.

The system can implement three layers of security procedures for transactions of digital stocks. First, the distributed ledger can be replicated into an encrypted data form and added to all users within the network, the system, and the custodian's account within the system. Then a link (or electronic stamp and signature) can be added into all the digital stocks to be able to trace real time current transactions and all historical transactions to prevent immutability. According to one embodiment, reversibility can be issued from authenticated users, but must be validated by the Talent, as an issuer, and any other affected user. Once a transaction is executed, unlike in current stock exchanges, the system does not need to transfer ownership as all the replicated copies of the ledger can be updated simultaneously and a digital stock owner can be encoded in the digital stock itself. As a result, the system does not need intermediaries such as brokers and lawyers, to verify or transfer ownership.

Users, which include investors, are registered and authorized by the system. The system administration can identify authorized users through performing Know Your Customer (KYC) checks. The system can use cryptographic codes to identify each user by cross referencing an entered e-signature with an authorized e-signature for the user.

As discussed above, the distributed ledger can be encrypted and replicated among the users in the network, the system, and the custodian accounts within the system. The encrypted data will hold the balance of each users and historical transactions. Users can view their own portion of assets within the network, but cannot view any other users' assets or transactions. Although all assets in the network are linked, the systems limits the Talent to only be able to access to his or her issuing assets and identify the users who hold them. Only system administrators and regulators can view all available information for regulatory and auditing purposes. Furthermore, this allows the system to be utilized to perform Anti Money Laundry (AML) checks and prevent any suspicious activities.

When a transaction is executed the system utilizes a system administrator to verify the transaction. The system administrator component can automatically check that available funds are available in a buyer's account and a digital stock being sold is owned by the seller. Upon verification, the system administrator can allow the system to execute the transaction and distribute the details to the distributed ledger. The records can be transparent and available to any regulating entity. The transaction can be verified by multiple "nodes" with a cryptography scheme such as ECDSA (Elliptic Curve Digital Signature Algorithm) and the network can be configured to perform consensus authorization and validation of transactions.

According to one embodiment, the distributed ledger technology removes the need for a central overseeing entity. It also removes computation and storage required by the central overseeing entity. Furthermore, costs related to reporting information to regulation bodies can be reduced. All information is easily accessible in the distributed ledger and therefore available to regulating bodies as needed. Given that the distributed ledger is present with several users across the network and the system encodes records in the digital stock, there is a reduced need for expensive backup databases.

The distributed ledger technology of the various embodiments also improves upon existing distributed ledgers such as that of Bitcoin. A possible reversibility of transactions in Bitcoin, unlike this system, creates a major issue because no authenticated individual or entity can be held accountable. The regulators will not recognize the legality of the bitcoin system because any anonymous validator can reverse a transaction. In addition, a "mining" requirement to validate the validator of the transaction or what is known as proof-of-work (POW) slows down the validation process as opposed to the example embodiment which has trust validated and can process transactions and settlements faster. Furthermore, validation in Bitcoin's distributed ledger requires tokens, or so-called Bitcoins to process each transaction. Within the example embodiment, all parties validating transactions have common interests to execute and the system administrator can validate the execution.

Additional Implementation Details

Various embodiments of the invention enable talented people to pursue their dreams without relying on conventional financing tools, such as getting loans or finding a production company. Many Talents in the world are discouraged by the traditional financial system from working on an invention or artwork that they are passionate about. With conventional financing methods, the financing decision is limited to a few elite decision makers such as banks, investment funds, or production companies. For example, a producer rejected to produce for the singer Michael Buble and told him that his music would not sell. The singer went to several banks trying to finance his album until he secured a loan. As a result of securing the loan, Buble managed to produce and sell more than 50 million albums around the world. Through various embodiments discussed herein, Talents such as Buble may have the ability to broadcast their Talents and receiving funding interests from around the globe.

In another case, NFL players' careers on average last only three years. Although they receive millions of dollars in compensation and endorsements, many end up bankrupt or face financial stress. Therefore, many active professional athletes attempt to create an additional source of income through private investments of which experts estimate that only one in thirty are successful. These investments and issues associated with them divert athletes from improving their athletic skills. Therefore, their career might be shortened before being able to achieve financial security that could support them during retirement. Various embodiments of the invention can provide relief to athletes' problems and enable generating additional income by bringing them the power of financial markets. In addition, various embodiments of the system provide athletes with financial security through a structured financial product that includes investment and insurance coverage.

Various aspects and functions described herein may be implemented as specialized hardware or software components executing in one or more specialized computer systems. There are many examples of computer systems that are currently in use that could be specially programmed or specially configured. These examples include, among others, network appliances, personal computers, workstations, mainframes, networked clients, servers, media servers, application servers, database servers, and web servers. Other examples of computer systems may include mobile computing devices (e.g., smart phones, tablet computers, and personal digital assistants) and network equipment (e.g., load balancers, routers, and switches). Examples of particular models of mobile computing devices include iPhones, iPads, and iPod Touches running iOS operating systems available from Apple, Android devices like Samsung Galaxy Series, LG Nexus, and Motorola Droid X, Blackberry devices available from Blackberry Limited, and Windows Phone devices. Further, aspects may be located on a single computer system or may be distributed among a plurality of computer systems connected to one or more communications networks.

Figure 24:
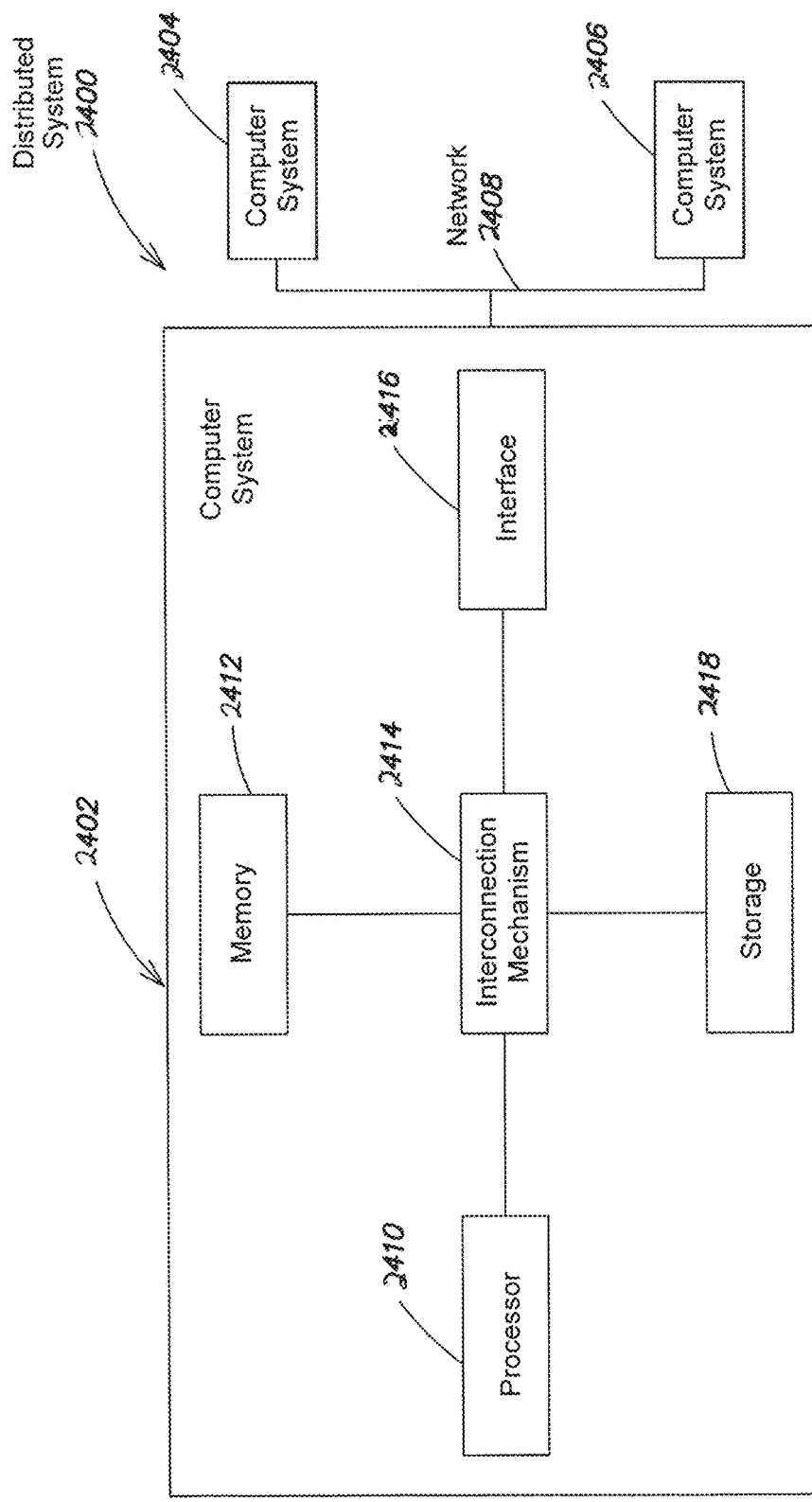
FIG. 24 is an example diagram of a distributed computer system which may be used to implement some embodiments.

For example, various aspects, functions, and processes may be distributed among one or more computer systems configured to provide a service to one or more client computers, or to perform an overall task as part of a distributed system, such as the distributed computer system 2400 shown in FIG. 24. Additionally, aspects may be performed on a client-server or multi-tier system that includes components distributed among one or more server systems that perform various functions. Consequently, embodiments are not limited to executing on any particular system or group of systems. Further, aspects, functions, and processes may be implemented in software, hardware or firmware, or any combination thereof. Thus, aspects, functions, and processes may be implemented within methods, acts, systems, system elements and components using a variety of hardware and software configurations, and examples are not limited to any particular distributed architecture, network, or communication protocol.

Referring to FIG. 24, there is illustrated a block diagram of a distributed computer system 2400, in which various aspects and functions are practiced. As shown, the distributed computer system 2400 includes one or more computer systems that exchange information. More specifically, the distributed computer system 2400 includes computer systems 2402, 2404, and 2406. As shown, the computer systems 2402, 2404, and 2406 are interconnected by, and may exchange data through, a communication network 2408. The network 2408 may include any communication network through which computer systems may exchange data. To exchange data using the network 2408, the computer systems 2402, 2404, and 2406 and the network 2408 may use various methods, protocols and standards, including, among others, Fiber Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST, and Web Services. To ensure data transfer is secure, the computer systems 2402, 2404, and 2406 may transmit data via the network 2408 using a variety of security measures including, for example, SSL or VPN technologies. While the distributed computer system 2400 illustrates three networked computer systems, the distributed computer system 2400 is not so limited and may include any number of computer systems and computing devices, networked using any medium and communication protocol.

As illustrated in FIG. 24, the computer system 2402 includes a processor 2410, a memory 2412, an interconnection element 2414, an interface 2416 and data storage element 2418. To implement at least some of the aspects, functions, and processes disclosed herein, the processor 2410 performs a series of instructions that result in manipulated data. The processor 2410 may be any type of processor, multiprocessor or controller. Example processors may include a commercially available processor such as an Intel Xeon, Itanium, Core, Celeron, or Pentium processor; an AMD Opteron processor; an Apple A4 or A5 processor; a Sun UltraSPARC processor; an IBM Power5+ processor; an IBM mainframe chip; or a quantum computer. The processor 2410 is connected to other system components, including one or more memory devices 2412, by the interconnection element 2414.

The memory 2412 stores programs (e.g., sequences of instructions coded to be executable by the processor 2410) and data during operation of the computer system 2402. Thus, the memory 2412 may be a relatively high performance, volatile, random access memory such as a dynamic random access memory ("DRAM") or static memory ("SRAM"). However, the memory 2412 may include any device for storing data, such as a disk drive or other nonvolatile storage device. Various examples may organize the memory 2412 into particularized and, in some cases, unique structures to perform the functions disclosed herein. These data structures may be sized and organized to store values for particular data and types of data.

Components of the computer system 2402 are coupled by an interconnection element such as the interconnection element 2414. The interconnection element 2414 may include any communication coupling between system components such as one or more physical busses in conformance with specialized or standard computing bus technologies such as IDE, SCSI, PCI and InfiniBand. The interconnection element 2414 enables communications, including instructions and data, to be exchanged between system components of the computer system 2402.

The computer system 2402 also includes one or more interface devices 2416 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 2402 to exchange information and to communicate with external entities, such as users and other systems.

The data storage element 2418 includes a computer readable and writeable nonvolatile, or non-transitory, data storage medium in which instructions are stored that define a program or other object that is executed by the processor 2410. The data storage element 2418 also may include information that is recorded, on or in, the medium, and that is processed by the processor 2410 during execution of the program. More specifically, the information may be stored in one or more data structures specifically configured to conserve storage space or increase data exchange performance. The instructions may be persistently stored as encoded signals, and the instructions may cause the processor 2410 to perform any of the functions described herein. The medium may, for example, be optical disk, magnetic disk or flash memory, among others. In operation, the processor 2410 or some other controller causes data to be read from the nonvolatile recording medium into another memory, such as the memory 2412, that allows for faster access to the information by the processor 2410 than does the storage medium included in the data storage element 2418. The memory may be located in the data storage element 2418 or in the memory 2412, however, the processor 2410 manipulates the data within the memory, and then copies the data to the storage medium associated with the data storage element 2418 after processing is completed. A variety of components may manage data movement between the storage medium and other memory elements and examples are not limited to particular data management components. Further, examples are not limited to a particular memory system or data storage system.

Although the computer system 2402 is shown by way of example as one type of computer system upon which various aspects and functions may be practiced, aspects and functions are not limited to being implemented on the computer system 2402 as shown in FIG. 24. Various aspects and functions may be practiced on one or more computers having a different architectures or components than that shown in FIG. 24. For instance, the computer system 2402 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 2402 may be a computer system including an operating system that manages at least a portion of the hardware elements included in the computer system 2402. In some examples, a processor or controller, such as the processor 2410, executes an operating system. Examples of a particular operating system that may be executed include a Windows-based operating system, such as, Windows NT, Windows 2000 (Windows ME), Windows XP, Windows Vista or Windows 7, 8, or 10 operating systems, available from the Microsoft Corporation, a MAC OS System X operating system or an iOS operating system available from Apple Computer, one of many Linux-based operating system distributions, for example, the Enterprise Linux operating system available from Red Hat Inc., a Solaris operating system available from Oracle Corporation, or a UNIX operating systems available from various sources. Many other operating systems may be used, and examples are not limited to any particular operating system.

The processor 2410 and operating system together define a computer platform for which application programs in high-level programming languages are written. These component applications may be executable, intermediate, byte-code or interpreted code which communicates over a communication network, for example, the Internet, using a communication protocol, for example, TCP/IP. Similarly, aspects may be implemented using an object-oriented programming language, such as .Net, SmallTalk, Java, C++, Ada, C# (C-Sharp), Python, or JavaScript. Other object-oriented programming languages may also be used. Alternatively, functional, scripting, or logical programming languages may be used.

Additionally, various aspects and functions may be implemented in a non-programmed environment. For example, documents created in HTML, XML or other formats, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or objects) that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user space application) or in a commonly shared data structure (such as an application registry that is defined by an operating system). In addition, some examples provide for both system and user interfaces that allow external entities to modify the parameters and thereby configure the behavior of the components.

Based on the foregoing disclosure, it should be apparent to one of ordinary skill in the art that the embodiments disclosed herein are not limited to a particular computer system platform, processor, operating system, network, or communication protocol. Also, it should be apparent that the embodiments disclosed herein are not limited to a specific architecture or programming language.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Use of at least one of and a list of elements (e.g., A, B, C) is intended to cover any one selection from A, B, C (e.g., A), any two selections from A, B, C (e.g., A and B), any three selections (e.g., A, B, C), etc., and any multiples of each selection.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A distributed computer system for encoding and distributing self-validating digital objects, the distributed computer system comprising:
    at least one processor operatively connected to a memory, the at least one processor configured to:
    search, collect, and store performance information associated with a talent;
    generate an output of predicted future earnings of the talent based on analysis of at least a first portion of the performance information;
    calculate a risk level for the talent as a function of at least the output, wherein the risk level is a value greater than or equal to a lower risk limit and less than or equal to an upper risk limit;
    select a set of one or more insurance plans for the talent based at least in part on the risk level;
    receive an input from the talent specifying at least one selected insurance plan from the set of one or more insurance plans, wherein the input specifying the at least one selected insurance plan includes a first digital signature of the talent;

verify identity of the talent based at least in part on the first digital signature;
encode, in a self-validating digital object responsive to verifying the identity of the talent:
  the output;
  the risk level;
  at least one function, wherein the at least one function includes processor-executable instructions for triggering at least one action corresponding to at least one condition being met with the at least one selected insurance plan, the at least one function corresponding to smart contract logic associated with the at least one selected insurance plan, the at least one action including a transfer of funds to at least one account associated with the talent; and
  a second digital signature of the output, the risk level, and the at least one function, wherein the second digital signature is an output of a digital signature function, and wherein generation of the second digital signature enables detection of any alteration to the output, the risk level, and the processor-executable instructions of the at least one function;
distribute replicas of the self-validating digital object, encoded with the output, the risk level, the at least one function, and the second digital signature, among a plurality of computing devices interconnected by a distributed ledger for storage, wherein the second digital signature encoded in the self-validating digital object allows verification of enrollment of the talent to the at least one selected insurance plan and verification that the output, the risk level, and the processor-executable instructions have not been altered, and wherein the self-validating digital object is further encoded with information for validation of the at least one action and the at least one condition;
automatically monitor at least one online data source to identify an occurrence of an event associated with an injury to the talent and associated with the at least one selected insurance plan, the identifying of the occurrence of the event including capturing and analyzing data in real time associated with the self-validating digital object and determining that the at least one condition has been met in order to prompt that the event has occurred, and wherein the capturing and analyzing data further includes receiving information based on an execution of at least one of an audio and visual processing application or natural language processing application configured to analyze broadcast or webcast information, in real time or near real time, to determine, in near real time, events associated with the talent; and
responsive to the prompt that the event has occurred associated with the injury to the talent, automatically trigger execution of the processor-executable instructions of the at least one function encoded in the self-validating digital object that cause the at least one processor to initiate the transfer of funds to the at least one account associated with the talent, and re-encode, responsive to the prompt, the self-validating digital object with a dynamic update to the smart contract logic associated with the at least one function of the at least one selected insurance plan;
wherein the at least one processor is further configured to:
  encode, in the self-validating digital object, an identity of a current owner of the self-validating digital object;
  receive a request to execute a transaction, wherein the transaction comprises transferring ownership of the self-validating digital object from a seller of the self-validating digital object to a buyer, the request comprising an amount of money to transfer from an account of the buyer to an account of the seller, a third digital signature of the buyer, and a fourth digital signature of the seller;
  verify, responsive to receiving the request to execute the transaction, that the account of the buyer includes the amount of money;
  verify, responsive to receiving the request to execute the transaction, that an identity of the seller of the self-validating digital object matches the identity of the current owner of the self-validating digital object;
  automatically execute the transaction, responsive to verifying that the account of the buyer includes the amount of money and that the identity of the seller matches the identity of the current owner of the self-validating digital object, wherein executing the transaction comprises modifying the identity of the current owner of the self-validating digital object to an identity of a second owner of the self-validating digital object and transferring the amount of money from the account of the buyer to the account of the seller, wherein the second owner of the self-validating digital object is the buyer;
  automatically encode a record of the transaction responsive to executing the transaction;
  encode the record of the transaction in at least one block;
  store the at least one block in a current distributed ledger to generate an updated distributed ledger; and
  replicate the updated distributed ledger to at least a portion of the plurality of computing devices.

2. The system of claim 1, wherein the at least one processor is further configured to:
  request approval from a provider of the at least one selected insurance plan if the risk level is greater than a threshold risk level; and
  encode the at least one execution function and the second digital signature in the self-validating digital object responsive to receiving the approval from the provider of the at least one selected insurance plan.

3. The system of claim 1, wherein the at least one processor is further configured to determine whether at least one portion of the data indicates that at least one condition is met.

4. The system of claim 3, wherein the at least one function includes instructions to execute the at least one action responsive to determining that the at least one portion of the data indicates that the at least one condition is met.

5. The system of claim 1, wherein the at least one processor is further configured to:
  generate a share contract wherein the share contract specifies a contract in which the talent agrees to give a percentage of income of the talent to an entity;
  receive a second input from the talent specifying agreement to the share contract, wherein the input includes the first digital signature of the talent;
  verify the identity of the talent based at least in part on the first digital signature;
  encode a share function and the first digital signature in the self-validating digital object responsive to verifying the identity of the talent, wherein the share function calculates the income of the talent and transmits the percentage of the income to the entity.

6. The system of claim 1, wherein the self-validating digital object represents a stock of an entity, wherein the stock of the entity comprises a share of ownership of the entity.

7. The system of claim 1, wherein the at least one processor is further configured to:
encode a record of owners of the self-validating digital object, wherein the record includes every owner of the self-validating digital object from an original owner of the self-validating digital object to the current owner of the self-validating digital object.

8. A computer implemented method for managing a talent exchange executed by at least one processor, the method comprising:
searching, collecting, and storing performance information associated with a talent;
generating an output of predicted future earnings of the talent based on analysis of at least a first portion of the performance information;
calculating a risk level for the talent as a function of at least the output, wherein the risk level is a value greater than or equal to a lower risk limit and less than or equal to an upper risk limit;
selecting a set of one or more insurance plans for the talent based at least in part on the risk level;
receiving an input from the talent specifying at least one selected insurance plan from the set of one or more insurance plans, wherein the input specifying the at least one selected insurance plan includes a first digital signature of the talent;
verifying identity of the talent based at least in part on the first digital signature; and
encoding, in a self-validating digital object responsive to verifying the identity of the talent:
the output;
the risk level;
at least one function, wherein the at least one function includes processor-executable instructions for triggering at least one action corresponding to at least one condition being met with the at least one selected insurance plan, the at least one function corresponding to smart contract logic associated with the at least one selected insurance plan, the at least one action including a transfer of funds to at least one account associated with the talent; and
a second digital signature of the output, the risk level, and the at least one function, wherein the second digital signature is an output of a digital signature function, and wherein generation of the second digital signature enables detection of any alteration to the output, the risk level, and the processor-executable instructions of the at least one function; and
distributing replicas of the self-validating digital object, encoded with the output, the risk level, the at least one function, and the second digital signature, among a plurality of computing devices interconnected by a distributed ledger for storage, wherein the second digital signature encoded in the self-validating digital object allows verification of enrollment of the talent to the at least one selected insurance plan and verification that the output, the risk level, and the processor-executable instructions of the at least one function have not been altered, and wherein the self-validating digital object is further encoded with information for validation of the at least one action and the at least one condition;

automatically monitoring at least one online data source to identify an occurrence of an event associated with an injury to the talent and associated with the at least one selected insurance plan, the identifying of the occurrence of the event including capturing and analyzing data in real time associated with the self-validating digital object and determining that the at least one condition has been met in order to prompt that the event has occurred, and wherein the capturing and analyzing data further includes receiving information based on an execution of at least one of an audio and visual processing application or natural language processing application configured to analyze broadcast or webcast information, in real time or near real time, to determine, in near real time, events associated with the talent;
responsive to the prompt that the event has occurred associated with the injury to the talent, automatically triggering execution of the processor-executable instructions of the at least one function encoded in the self-validating digital object that cause the at least one processor to initiate the transfer of funds to the at least one account associated with the talent, and re-encode, responsive to the prompt, the self-validating digital object with a dynamic update to the smart contract logic associated with the at least one function of the at least one selected insurance plan;
encoding, in the self-validating digital object, an identity of a current owner of the self-validating digital object;
receiving a request to execute a transaction, wherein the transaction comprises transferring ownership of the self-validating digital object from a seller of the self-validating digital object to a buyer, the request comprising an amount of money to transfer from an account of the buyer to an account of the seller, a third digital signature of the buyer, and a fourth digital signature of the seller;
verifying, responsive to receiving the request to execute the transaction, that the account of the buyer includes the amount of money;
verifying, responsive to receiving the request to execute the transaction, that an identity of the seller of the self-validating digital object matches the identity of the current owner of the self-validating digital object;
automatically executing the transaction, responsive to verifying that the account of the buyer includes the amount of money and that the identity of the seller matches the identity of the current owner of the self-validating digital object, wherein executing the transaction comprises modifying the identity of the current owner of the self-validating digital object to an identity of a second owner of the self-validating digital object and transferring the amount of money from the account of the buyer to the account of the seller, wherein the second owner of the self-validating digital object is the buyer; and
automatically encoding a record of the transaction responsive to executing the transaction,
wherein encoding the record of the transaction comprises:
encoding the record of the transaction in at least one block;
storing the at least one block in a current distributed ledger to generate an updated distributed ledger; and
replicating the updated distributed ledger to at least a portion of the plurality of computing devices.

9. The method of claim 8, further comprising:
requesting approval from a provider of the at least one selected insurance plan if the risk level is greater than a threshold risk level; and
encoding the at least one function and the second digital signature in the self-validating digital object responsive to receiving the approval from the provider of the at least one selected insurance plan.

10. The method of claim 8, further comprising:
determining whether at least one portion of the data indicates that at least one condition is met.

11. The method of claim 10, wherein at least one function includes instructions to execute the at least one action responsive to the determining that the at least one portion of the data indicates that the at least one condition is met.

12. The method of claim 8, further comprising:
generating a share contract wherein the share contract specifies a contract in which the talent agrees to give a percentage of income of the talent to an entity;
receiving a second input from the talent specifying agreement to the share contract, wherein the input includes the first digital signature of the talent;
verifying the identity of the talent based at least in part on the first digital signature;
encoding a share function and the first digital signature in the self-validating digital object responsive to verifying the identity of the talent, wherein the share function calculates the income of the talent and transmits the percentage of the income to the entity.

13. The method of claim 8, wherein the self-validating digital object represents a stock of the entity, wherein the stock of the entity comprises a share of ownership of the entity.

14. The method of claim 8, further comprising:
encoding a record of owners of the self-validating digital object, wherein the record includes every owner of the self-validating digital object from an original owner of the self-validating digital object to the current owner of the self-validating digital object.

15. A distributed computer system for encoding and distributing self-validating digital objects, the distributed computer system comprising:
at least one application program interface (API);
at least one processor operatively connected to a memory, the at least one processor configured to:
search for and store textual web content related to a talent;
receive, via the API, statistical data related to the talent;
receive, via the API, at least one video clip of the talent;
process the textual web content and determine a negative, neutral, or positive textual web content output;
process the at least one video clip and determine a negative, neutral, or positive video clip output;
generate predicted future earnings of the talent as a function of the statistical data;
calculate a risk level for the talent as a function having one or more of the textual web content output, the video clip output, and the predicted future earnings as one or more inputs of the function, wherein the risk level is a value greater than or equal to a low risk limit and less than or equal to an upper risk limit;
select a set of one or more insurance plans for the user based on the risk level;
receive an input from the talent specifying a selected insurance plan from the set of one or more insurance plans, wherein the input specifying the selected insurance plan includes a first digital signature of the talent;
verify that the first digital signature maps to an identity of the talent by checking a mapping of digital signatures to identities; and
encode, in a self-validating digital object responsive to verifying that the first digital signature maps to the identity of the talent:
the one or more inputs of the function used to calculate the risk level;
the risk level;
at least one function, wherein the at least one function includes processor-executable instructions for triggering at least one action corresponding to at least one condition being met with the selected insurance plan, the at least one function corresponding to smart contract logic associated with the at least one selected insurance plan, the at least one action including a transfer of funds to at least one account associated with the talent; and
a second digital signature of the one or more of the textual web content output, the video clip output, and the predicted future earnings used to calculate the risk level, the risk level, and the at least one function, wherein the second digital signature is an output of a digital signature function, and wherein generation of the second digital signature enables detection of any alteration to the one or more inputs of the function used to calculate the risk level, the risk level, and the processor-executable instructions of the at least one function;
distribute replicas of the self-validating digital object, encoded with the one or more inputs of the function used to calculate the risk level, the risk level, the at least one function, and the second digital signature, among a plurality of computing devices interconnected by a distributed ledger for storage, wherein the second digital signature encoded in the self-validating digital object allows verification of enrollment of the talent to the at least one selected insurance plan and verification that the one or more inputs of the function used to calculate the risk level, the risk level, and the processor-executable instructions of the at least one function have not been altered, and wherein the self-validating digital object is further encoded with information for validation of the at least one action and the at least one condition;
automatically monitor at least one online data source to identify an occurrence of an event associated with an injury to the talent and associated with the at least one selected insurance plan, the identifying of the occurrence of the event including capturing and analyzing data in real time associated with the self-validating digital object and determining that the at least one condition has been met in order to prompt that the event has occurred, and wherein the capturing and analyzing data further includes receiving information based on an execution of at least one of an audio and visual processing application or natural language processing application configured to analyze broadcast or webcast information, in real time or near real time, to determine, in near real time, events associated with the talent; and
responsive to the prompt that the event has occurred associated with the injury to the talent, automatically trigger execution of the processor-executable instructions of the at least one function encoded in the self-validating digital object that cause the at least one processor to initiate the transfer of funds to the at least one account associated with the talent, and re-encode, responsive to the prompt, the self-validating digital object with a dynamic update to the smart contract logic associated with the at least one function of the at least one selected insurance plan, wherein the at least one processor is further configured to:

encode, in the self-validating digital object, an identity of a current owner of the self-validating digital object;

receive a request to execute a transaction, wherein the transaction comprises transferring ownership of the self-validating digital object from a seller of the self-validating digital object to a buyer, the request comprising an amount of money to transfer from an account of the buyer to an account of the seller, a third digital signature of the buyer, and a fourth digital signature of the seller;

verify, responsive to receiving the request to execute the transaction, that the account of the buyer includes the amount of money;

verify, responsive to receiving the request to execute the transaction, that an identity of the seller of the self-validating digital object matches the identity of the current owner of the self-validating digital object;

automatically execute the transaction, responsive to verifying that the account of the buyer includes the amount of money and that the identity of the seller matches the identity of the current owner of the self-validating digital object, wherein executing the transaction comprises modifying the identity of the current owner of the self-validating digital object to an identity of a second owner of the self-validating digital object and transferring the amount of money from the account of the buyer to the account of the seller, wherein the second owner of the self-validating digital object is the buyer;

automatically encode a record of the transaction responsive to executing the transaction;

encode the record of the transaction in at least one block;

store the at least one block in a current distributed ledger to generate an updated distributed ledger; and replicate the updated distributed ledger to at least a portion of the plurality of computing devices.

\* \* \* \* \*